(12) United States Patent
Holmes et al.

(10) Patent No.: US 11,249,799 B2
(45) Date of Patent: Feb. 15, 2022

(54) METHODS, SYSTEMS, AND DEVICES FOR REAL TIME EXECUTION AND OPTIMIZATION OF CONCURRENT TEST PROTOCOLS ON A SINGLE DEVICE

(71) Applicant: Labrador Diagnostics LLC, Wilmington, DE (US)

(72) Inventors: Elizabeth A. Holmes, Palo Alto, CA (US); Daniel Young, Palo Alto, CA (US)

(73) Assignee: Labrador Diagnostics LLC, Wilmington, DE (US)

( * ) Notice: Subject to any disclaimer, the term of this patent is extended or adjusted under 35 U.S.C. 154(b) by 1386 days.

(21) Appl. No.: 14/181,486

(22) Filed: Feb. 14, 2014

(65) Prior Publication Data

US 2014/0229955 A1    Aug. 14, 2014

Related U.S. Application Data

(63) Continuation-in-part of application No. 13/244,946, filed on Sep. 26, 2011, now Pat. No. 8,380,541, and a continuation-in-part of application No. 13/244,949, filed on Sep. 26, 2011, and a continuation-in-part of application No. 13/244,950, filed on Sep. 26, 2011, and a continuation-in-part of application No.
(Continued)

(51) Int. Cl.
| | |
|---|---|
| *G06F 15/16* | (2006.01) |
| *G06F 9/48* | (2006.01) |
| *G01N 35/00* | (2006.01) |
| *H04L 67/10* | (2022.01) |
| *H04L 67/12* | (2022.01) |

(52) U.S. Cl.
CPC ....... *G06F 9/4881* (2013.01); *G01N 35/0092* (2013.01); *G06F 15/16* (2013.01); *H04L 67/10* (2013.01); *H04L 67/12* (2013.01)

(58) Field of Classification Search
CPC ........ G06Q 50/22–24; G16H 10/00–65; G06F 9/4881; G06F 15/16; G01N 35/0092; H04L 67/10; H04L 67/12
USPC ...................................................... 705/2–3
See application file for complete search history.

(56) References Cited

U.S. PATENT DOCUMENTS

| | | | |
|---|---|---|---|
| 8,024,395 B1 * | 9/2011 | Odom | G06F 9/5072 709/201 |
| 2007/0124082 A1 * | 5/2007 | Torre-Bueno | G01N 35/00871 702/19 |

(Continued)

FOREIGN PATENT DOCUMENTS

EP    1881329 A2    1/2008

OTHER PUBLICATIONS

Office Action dated Feb. 21, 2017 for U.S. Appl. No. 15/159,593.
(Continued)

*Primary Examiner* — Michael Tomaszewski

(57) ABSTRACT

Provided herein are medical testing devices, systems, and methods that integrate multiplex, multi-technology, multi-configuration, multisample, or multi-threading capabilities. These capabilities are achieved using one or more of a level operations and communications architecture, a protocol execution engine, and a machine vision and processing system, method, or device in order to make testing of biologic or other samples more efficient in terms of cost, time, energy, or by prioritizing at least one other objective.

20 Claims, 9 Drawing Sheets

Related U.S. Application Data

13/244,954, filed on Sep. 26, 2011, now Pat. No. 8,840,838, and a continuation-in-part of application No. 13/244,956, filed on Sep. 26, 2011, now Pat. No. 9,268,915, and a continuation-in-part of application No. 13/769,779, filed on Feb. 18, 2013, now Pat. No. 9,250,229, and a continuation-in-part of application No. 13/769,798, filed on Feb. 18, 2013.

(60) Provisional application No. 61/766,112, filed on Feb. 18, 2013.

(56) References Cited

U.S. PATENT DOCUMENTS

| | | | | |
|---|---|---|---|---|
| 2007/0241068 | A1* | 10/2007 | Pamula | B01L 3/502715 210/806 |
| 2008/0020469 | A1* | 1/2008 | Barnes | G06Q 10/06 436/46 |
| 2008/0215409 | A1* | 9/2008 | Van Matre | G06Q 10/0631 705/7.12 |
| 2014/0100139 | A1* | 4/2014 | Barnes | G01N 35/0092 506/12 |
| 2016/0341752 | A1 | 11/2016 | Holmes et al. | |

OTHER PUBLICATIONS

International Search Report and Written Opinion dated Jun. 19, 2014 for Application No. PCT/US2014/016548.

Ramamritham K. et al. "Scheduling algorithms and operating systems support for real-time systems." Proceedings of the IEEE, 1994; 82(1): 55-67, especially pp. 57-58.

Xie Z. et al., "A new algorithm for complex product flexible scheduling with constraint between jobs." Computers & Industrial Engineering, 2009; 57: 766-772. doi:10.1016/j.cie.2009.02.004.

510(k) Substantial Equivalence Determination Decision Summary dated Jul. 16, 2015 for "Theranos Herpes Simplex Virus-1 (HSV-1) IgG Assay".

510(k) Substantial Equivalence Determination issued for "Theranos Herpes Simplex Virus-1 IgG Assay" by the FDA on Jul. 7, 2015.

Diamandis. Theranos phenomenon: promises and fallacies. Clin Chern Lab Med. Jun. 2015;53(7):989-93.

Fuller K. Centers for Medicare and Medicaid Services (CMS). Condition Level Deficiencies Notice—Immediate Jeopardy. Notice to Theranos, Inc. director Dr. Sunil Dhawan. Jan. 25, 2016. https://cdn2.vox-cdn.com/uploads/chorus_asset/file/5969923/Theranos_Inc_Cover_Letter_01-25-2016.0.pdf.

Loria K. More skeptical than ever: Experts respond to the government's warning letter to Theranos. Jan. 28, 2016. Tech Insider. http://www.techinsider/io/how-bad-the-cms-letter-to-theranos-really-is-2016-1.

Plebani. Evaluating and using innovative technologies: a lesson from Theranos? Clin Chern Lab Med. Jun. 2015;53(7):961-2.

Ramsey L. Theranos has a week to respond to the searing report about its business. Business Insider. Feb. 5, 2016. http://www.businessinsider.com/theranos-response-to-cms-2016-2.

Rappleye E. Theranos gets extension to fix issues following CMS investigation. Becker's Hospital Review. Feb. 8, 2016. http://www.beckershospitalreview.com/hospital-management-adminstration/theranos-gets-extension-to-fix-issues-following-cms-investigation.html.

* cited by examiner

METHODS, SYSTEMS, AND DEVICES FOR REAL TIME EXECUTION AND OPTIMIZATION OF CONCURRENT TEST PROTOCOLS ON A SINGLE DEVICE

CROSS-REFERENCE

This application claims the benefit of U.S. Patent Application 61/766,112 filed Feb. 18, 2013; and is a continuation-in-part of, and claims priority to U.S. patent application Ser. No. 13/244,946, filed Sep. 26, 2011; U.S. patent application Ser. No. 13/244,949, filed Sep. 26, 2011; U.S. patent application Ser. No. 13/244,950, filed Sep. 26, 2011; U.S. patent application Ser. No. 13/244,954, filed Sep. 26, 2011; U.S. patent application Ser. No. 13/244,956, filed Sep. 26, 2011; U.S. patent application Ser. No. 13/769,779, filed Feb. 18, 2013; and U.S. patent application Ser. No. 13/769,798, filed Feb. 18, 2013, all of which applications are hereby incorporated by reference in their entireties.

BACKGROUND OF THE INVENTION

Medical evaluation and diagnosis often includes the testing of one or more biologic samples from a patient or subject. Testing laboratories may be inundated with samples from various subjects, which may be of different biologic types, or which may have different testing parameter needs and orders, for example. Testing results should be reliable, safe, efficient, performed according to prescribed testing parameters to assure the proper output of the test is provided, and ultimately to assure that the proper information is passed to the patient or care giver regarding the sample tested.

SUMMARY OF THE INVENTION

Provided herein is a computer-assisted method for scheduling biological or chemical assays comprising providing a set of input processes defining the biological or chemical assays to be performed by one or more devices, wherein an individual device comprises a plurality of stations, wherein said stations are selected from the group containing sample preparation stations, detection stations, and assay stations that provide consumable reagents and wherein at least one of said stations is a detection station.

The method may comprise generating a list of one or more subtasks for each of the input processes, wherein each subtask is to be performed by a single station of the one or more devices. The method may comprise using a flexible scheduling algorithm to generate an ordered schedule of subtasks for the plurality of stations of the one or more devices such that when the subtasks are performed by the one or more devices, the input processes are completed in a manner more efficiently than if the input processes were performed sequentially by the plurality of stations. The method may further comprise instructing the stations to perform the associated subtasks according to the generated schedule of subtasks. Optionally, the method may comprise using at least one detection station to collect information regarding the status of an individual biological or chemical assay and utilizing said information to maintain or modify the schedule of subtasks.

In some embodiments, the set of input processes are completed in less than the time required if the set of input processes were performed sequentially. The set of input processes may be performed in less than 80% of the time required if the set of input processes were performed sequentially. The set of input processes may be performed, on average, in less than 80% of the time required if the set of input processes were performed sequentially.

The set of input processes may be completed with one or more devices consuming less than the total amount of energy required by the one or more devices if the set of input processes were performed sequentially. The set of input processes may be completed with a total cost less than that required if the set of input processes were performed sequentially.

In some embodiments, said subtasks are all performed on a sample with a total volume of 250 µL or less.

In some embodiments, a station is able to perform a subtask that cannot be performed by another station.

The method may comprise providing at least one additional input process after the one or more devices have begun to perform the subtasks generated from the set of input processes, and generating an additional list of one or more subtasks for each of the at least one additional input processes, wherein each subtask is to be performed by a single station of the one or more devices. The method may comprise using a flexible scheduling algorithm to generate an additional ordered schedule of subtasks for the plurality of stations of the one or more devices comprising the additional list of subtasks and the subtasks not yet performed by the one or more devices such that when the subtasks are performed by the one or more devices, the input processes are completed in a manner more efficiently than if the input processes were performed sequentially by the plurality of stations. The method may comprise instructing the stations to perform their associated subtasks according to the additional generated schedule of subtasks.

In certain embodiments, any one or more of the steps of: providing an additional input process, generating an additional list of at least one subtask for the additional input process, using a flexible scheduling algorithm to generate an additional ordered schedule of subtasks, and instructing the stations to perform their associated subtask according to the additional generated schedule may be repeated at least one time.

The device of some embodiments comprises a computing station that performs the scheduling algorithm.

The method may comprise providing a computing station separate from the one or more devices that performs the scheduling algorithm and a network that communicated the schedules of subtasks to the one or more devices.

In some embodiments, the biological or chemical assays are selected from the group comprising immunoassays, nucleic acid assays, receptor-based assays, cytometry, colorimetric assays, enzymatic assays, mass spectroscopy, infrared spectroscopy, x-ray photoelectron spectroscopy, electrophoresis, nucleic acid sequencing, agglutination, chromatography, coagulation, electrochemical measurements, microscopy, live cell analysis, and histology.

The method may comprise collecting data from at least one of the input processes, utilizing said data to determine a set of one or more processes to be performed in addition to the input processes, generating a list of one or more subtasks for each of the one or more additional processes, wherein each subtask can be performed by a single station of the one or more devices; using said flexible scheduling algorithm to generate an additional ordered schedule of subtasks; and instructing the stations to perform their associated subtasks according to the additional generated schedule of subtasks.

Provided herein is a device that performs a variety of biological or chemical assays comprising: a sample collection station, configured to accept a sample; a plurality of stations, wherein said stations are selected from the group containing sample processing stations, detection stations, and supply stations that provide consumable reagents; a computing unit that is configured to generate an ordered schedule of subtasks for the plurality of stations based on a set of input processes defining the biological or chemical assays to be performed on a sample, wherein each subtask is to be performed by a single station, such that when the subtasks are performed by the device, the set of input processes are completed in a manner more efficiently than if the plurality of processes were performed sequentially, and wherein said computing unit is capable of modifying said schedule of subtasks in real-time; and a control unit that is configured to individually control the plurality of stations to perform their associated subtasks according to the generated schedule of subtasks.

Provided herein is a computer-assisted method for scheduling a plurality of processes on one or more devices, comprising: providing a set of input processes defining biological or chemical assays to be performed by the one or more devices, wherein an individual device comprises a plurality of stations, wherein said stations are selected from the group containing sample preparation stations, detection stations, and assay stations that provide consumable reagents; generating a list of one or more subtasks for each of the input processes, wherein each subtask is to be performed by a single station of the one or more devices; for each of the one or more subtasks, determining specified constraints selected from the group consisting of subtask resource requirements, the duration of time required, and subtask ordering requirements; and determining at least one schedule of subtasks and assignment of resources to each subtask in order to complete the entire set of processes consistent with all the specified constraints.

The method may further comprise: from the at least one schedule of subtasks, selecting a preferred schedule to be performed based on the efficiency of performing the set of input processes according to said schedule. The preferred schedule may have the lowest total time required to perform the set of input processes.

Provided herein is a non-transitory computer readable medium comprising code, language, or instructions for performing a method for determining a subtask order and for assigning resources to each subtask, said method comprising: a) for each of the subtasks, determining the subtask resource requirements and subtask ordering requirements; b) determining a current state of a device, wherein the device comprises a plurality of stations, wherein said stations are selected from the group containing sample preparation stations, detection stations, and assay stations that provide consumable reagents, wherein said state of the device comprises the time to reach the current state from the starting point; the order of completed subtasks, their starting times, and resource allocations; which subtasks are remaining to run, currently running, and complete; and which resources are available, in use, or unavailable due to certain types of previous use; c) generating a list of heuristically reasonable device operations that can be performed next, based on the current state of the device, the subtask resource requirements, and the subtask ordering requirements; d) generating a new state based on said list of device operations; e) repeating (b)-(d) until the method has generated the state or set of states in which all the processes are completed; f) determining the sequence(s) of state(s) based on efficiency of the sequences of states; and g) outputting at least one of said sequences of state(s). The method may further comprises determining whether a state is suboptimal and excluding such a state from consideration.

Provided herein is a computer-assisted method for scheduling biological or chemical assays comprising: providing a system comprising one or more stations, an individual station configured to accept a sample and perform at least one subtask for a biological or chemical assay with said sample; receiving, at said system, at least one sample, upon which at least one station is configured to perform at least one subtask; generating a schedule for said plurality of subtasks formed by said one or more stations based on the efficiency of said schedule and anticipated availability of said one or more stations; receiving, at said system, at least one additional sample, upon which at least one station is configured to perform at least one subtask; and maintaining or modifying said schedule based on the efficiency of said schedule, anticipated availability of said one or more stations, and subtasks to be performed on said at least one additional sample.

The at least one additional sample may be provided after at least one station begins performing a subtask in accordance with said schedule.

The method may comprise collecting information from at least one station; and maintaining or modifying said schedule based on the efficiency of said schedule, anticipated availability of the one or more stations, and said information collected. The increased efficiency may mean that the total time to perform the plurality of subtasks is reduced. The increased efficiency may mean that the total amount of energy consumed by the system during the performance of said plurality of subtasks is reduced. The increased efficiency may mean that the total cost associated with the performance of said plurality of subtasks is reduced.

At least one of said subtasks may be used for immunoassay, nucleic acid assay, receptor-based assay, cytometry, colorimetric assay, enzymatic assay, mass spectroscopy, infrared spectroscopy, x-ray photoelectron spectroscopy, electrophoresis, nucleic acid sequencing, agglutination, chromatography, coagulation, electrochemical measurements, live cell analysis, or histology.

The sample may have a volume of 250 uL or less.

Provided herein is a system for performing biological or chemical assays, comprising: a sample collection unit, configured to accept a sample; a plurality of stations, an individual station configured to accept at least a portion of said sample and perform at least one subtask for the biological or chemical assay with said portion of said sample; and a controller that generates a schedule for said plurality of subtasks performed by said plurality of stations based on the efficiency of said schedule and anticipated availability of said plurality of stations, and that provides instructions that effects operations of said plurality of stations to perform said subtasks in accordance with said schedule.

The system may comprise a collection station configured to collect information from at least one station, and wherein the controller maintains or modifies said schedule based on the efficiency of said schedule, anticipated availability of said plurality of stations, and said information collected by said collection station. The station may be selected from the group consisting of: sample preparation station, assay station, detection station, incubation station, and sample handling station. In some embodiments, at least one station comprises a centrifuge. In some embodiments at least one station comprises a thermal block. In some embodiments at least one station is a centrifuge or thermal block. In some embodiments, at least one station comprises a centrifuge or a thermal block.

The schedule may be based on a plurality of said subtasks being performed in a predetermined sequence or relative timing of said subtasks.

Increased efficiency may mean that the total time to perform the plurality of subtasks is reduced.

In certain embodiments, the sample has a volume of 250 uL or less.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
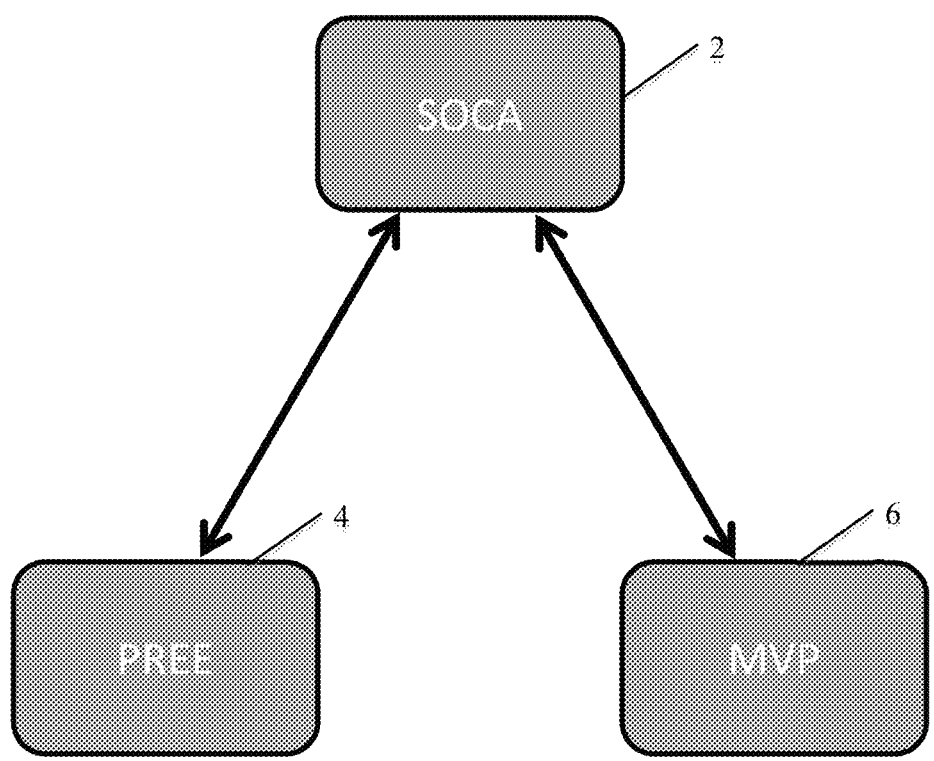
FIG. 1 depicts possible interaction pathways between SOCA 2, PREE 4, and MVP 6.

The present invention is explained in greater detail below. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations and variations thereof.

Medical testing devices process clinical samples, carrying out a sequence of assay specific steps, in order to determine quantitatively and/or qualitatively certain medical parameters of clinical import. Such devices may be used in point-of-care (POC), near patient, and/or laboratory based scenarios depending on its configuration and operational requirements.

Provided herein are medical testing devices, systems, and methods that integrate any two or more of the following device capabilities: 1) multiplex, 2) multi-technology, 3) multi-configuration, 4) multisample, and/or 5) multi-threading. Multiplex refers to a device, system, or method that is designed to analyze more than one biologic parameter (i.e., test) on each sample, typically referred to as a multiplex assay system. Multi-technology refers to a device, system, or method that is designed to be able to perform multiple types of tests, such as immunoassays and nucleic acid amplification (for non-limiting example). Multiconfiguration refers to a device, system, or method designed with the flexibility to process different combinations of tests on a given patient sample. Multi-sample refers to a device, system, or method designed to process more than one patient sample at one time, whether the sample is from the same patient and/or a different patient. Multi-threading refers to a device, system, or method designed to accept and process patient samples at different, unplanned times. Each of the above five device design capabilities provides specific advantages over conventional medical testing devices.

Moreover, integration of these capabilities into a single device provides further advantages, including complete automation of laboratory procedures and controls, optimal utilization of small-volume biologic samples, rapid results, reflex testing, enhanced reliability, multiple use cases (i.e., flexibility with respect to diversity of tests and test order combinations), patient convenience, and overall time and cost savings.

Three technologies that enable the robust, reliable, and optimal performance of the device are: 1) Systems-level operations and communications architecture (SOCA) 2) Protocol execution engine (PREE) and 3) Machine vision and processing (MVP)

Systems-Level Operations and Communications Architecture (SOCA)

The systems-level operations and communications architecture (SOCA) is designed to maintain, record, and optimize overall device performance. The SOCA may comprise any one or more of a server, computer, and non-transitory computer readable medium comprising code, language, or instructions for maintaining, recording, and/or optimizing overall device performance. SOCA may automatically ensure and document all laboratory procedures and controls required to demonstrate analytic performance of performed tests for the laboratory. In this way, participating laboratories effortlessly comply with regulatory standards, such as those defined by Clinical Laboratory Improvement Amendments (CLIA). The automated system controlled by SOCA may reduce or eliminate human errors that may be associated with laboratory procedures, such as sample preparation, assay procedures, calibration, control, device maintenance, and test reporting.

SOCA may be distributed on both the server side (separate from the device) and the device side, or on at least one of these sides, to ensure high performance computing, maximal throughput, and database communications. SOCA may be used to integrate stored data with real-time data from PREE and MVP to monitor device performance and test results by comparing data to historical data, trends, and panic values. In a reciprocal fashion, SOCA may provide control input and data to PREE and MVP. FIG. 1 shows possible interaction pathways between SOCA 2, PREE 4, and MVP 6.

In some embodiments, there is interaction directly between PREE 4 and MVP 6 as well, or alternatively to the interaction pathways between SOCA 2 and PREE 4, or SOCA 2 and MVP 6. Alternatively or additionally, SOCA may be integrated into PREE or MVP or some aspects of SOCA may be integrated into PREE and some aspects may be integrated into MVP which interact with each other to achieve the functions and aspects described to be part of SOCA.

Real-time integration of data and communications between PREE, MVP, and/or SOCA, enables SOCA to execute and maintain systems-level complex operations both onsite (at the location of the device) and offsite (at a location separate from the device). Onsite may refer to within the device itself, or may refer to in the same physical building or room as the device. Offsite may refer to a location that is next to but not including the device itself, such as part of a separate controller or computer or server than the device itself, or may refer to a location more physically distant from the device, such as in a separate room, building or physical address than the device. Communication is achieved through electronic or wireless methods, including wired, wireless, satellite, using a network, the internet, or through other methods. The communications between SOCA and PREE, or SOCA and MVP, or PREE and MVP, may be achieved using a closed system, or may be connected to or through the internet. The SOCA may reside in a cloud computing infrastructure which may deliver the functionalities of SOCA as a service rather than as a product, and whereby shared resources, software and information are provided to the PREE or MVP as a utility over a network such as the internet.

Any of the SOCA, MVP, PREE or the device or system used therewith may comprise a communication unit for communication externally to the SOCA, MVP, PREE, and device, or for communication among the SOCA, MVP, PREE and devices and systems used therewith. The communication unit may utilize a cloud computing infrastructure, part of a cloud computing infrastructure, or may interact with a cloud computing infrastructure.

The communication unit may permit wireless communication between and among the device or devices and an external device. The external device may comprise the SOCA, MVP, and/or the PREE, or any capabilities or functions thereof. The external device may comprise non-transitory computer readable media, which may include code, logic, or instructions capable of performing steps described herein. The external device may comprise non-transitory computer readable media, which may include code, logic, or instructions capable of performing steps ascribed to any one or more of the SOCA, MVP, and the PREE.

The communication unit may provide wired communication between the device and the external device. The communication unit may be capable of transmitting and/or receiving information wirelessly from an external device. The communication unit may permit one way and/or two-way communication between the device and one or more external device. In some embodiments, the communication unit may transmit information collected or determined by the device to an external device. In some embodiments, the communication unit may be receiving a protocol of one or more instructions from the external device. The device may be able to communicate with selected external devices, or may be able to communicate freely with a wide variety of external devices.

In some embodiments, the communication unit may permit the device to communicate over a network, such as a local area network (LAN) or wide area network (WAN) such as the Internet. In some embodiments, the device may communicate via a telecommunications network, such as a cellular or satellite network.

Some examples of technologies that may be utilized by a communication unit may include Bluetooth or RTM technology. Alternatively, various communication methods may be utilized, such as a dial-up wired connection with a modem, a direct link such as TI, ISDN, or cable line. In some embodiments, a wireless connection may be using exemplary wireless networks such as cellular, satellite, or pager networks, GPRS, or a local data transport system such as Ethernet or token ring over a LAN. In some embodiments, the communication unit may contain a wireless infrared communication component for sending and receiving information.

In some embodiments, the information may be encrypted before it is transmitted over a network, such as a wireless network.

Each device may have a communication unit. In some instances, each device may have its own local communication unit and may be capable of communicating independently of other devices. The device may use its communication unit to communicate with an external device or with another device at the same location or another location. In some instances, the devices may be able to share resources. For example, if a communication unit in one of the devices is damaged or impaired, the device may be able to access the communication unit of another device. In some instances, devices, components or portions of device components may be able to share one or more routers. The various levels and/or components in the hierarchy may be able to communicate with one another.

Optionally, device components may have a communication unit. Any discussion herein relating to communication units of devices may also relate to communication units at other levels, such as systems, groups of devices, device components, or portions of device components.

The systems-level complex operations of SOCA, may comprise systems, methods, or devices for responding to and mitigating device irregularities. The systems-level complex operations of SOCA, may comprise systems, methods, or devices for calculating system requirements for executing patient orders (for example, calculating in real time the minimum number of different test cartridges required to fulfill a given test order). The systems-level complex operations of SOCA, may comprise systems, methods, or devices for continually monitoring and reporting of onsite conditions such as availability of test cartridges and device real-time status. The systems-level complex operations of SOCA, may comprise systems, methods, or devices for continually monitoring, recording, and informing the onsite device operators of device conditions and performance, and environmental factors that could impact device performance. The systems-level complex operations of SOCA, may comprise systems, methods, or devices for reporting of test and control data onsite and to servers via secure communication channels. The systems-level complex operations of SOCA, may comprise systems, methods, or devices for reporting of device performance and/or reporting of critical and panic values that may trigger reflex testing and/or may require review by laboratory directors. The systems-level complex operations of SOCA, may comprise systems, methods, or devices for enabling proficiency testing and reporting. The systems-level complex operations of SOCA, may comprise systems, methods, or devices for performing calibration and calibration verification procedures. The systems-level complex operations of SOCA, may comprise systems, methods, or devices for verifying reagent and material lots are within expiration dates, verifying storage history, and/or using appropriate calibrations. The systems-level complex operations of SOCA, may comprise systems, methods, or devices for verifying device maintenance status. The systems-level complex operations of SOCA, may comprise systems, methods, or devices for retaining of complete device history (e.g., performance, maintenance, use history, etc.). The systems-level complex operations of SOCA, may comprise systems, methods, or devices for comparing test results across devices and locations on a periodic basis to ensure consistent results. Any one or more of the systems-level complex operations of SOCA may be performed in accordance with regulatory or other requirements including good laboratory practices for nonlimiting example.

SOCA can cause the complex medical testing device to be operated optimally (or at least more efficiently than another performance of the same testing) and reliably with minimal operator input without the need for operator customizations in diverse and changing environments. Efficient and reliable performance ensures improved test throughput, reduced down time or repeat testing, and improved precision and accuracy.

Moreover, through automation, system monitoring, response and mitigation, and data retention and record keeping, SOCA can ensures and enables compliance with appropriate regulatory requirements, such as CLIA.

SOCA may also and/or alternatively comprise features that need not be performed in real-time, but may be in real-time depending on the embodiment. Thus, SOCA may comprise methods, devices, or systems that are adapted to ensure that device performance across all acceptable use cases meets validation criteria, compute the optimal combination of tests to combine on a set of test cartridges that reduce the number of cartridges required to fulfill patient test orders, and/or compute the optimal physical layout of test components on a cartridge to optimize device run times. In some embodiments, a device or system may comprise a cartridge. The cartridge may be removable from the device. Alternatively, the cartridge may be permanently affixed to or integral to the device.

A cartridge may be inserted into the sample processing device or otherwise interfaced with the device. The cartridge may be attached to the device. The cartridge may be removed from the device. In one example, a sample may be provided to a sample collection unit of the cartridge. The sample may or may not be provided to the sample collection unit via a bodily fluid collector. A bodily fluid collector may be attached to the cartridge, removably attachable to the cartridge, or may be provided separately from the cartridge. The bodily fluid collector may or may not be integral to the sample collection unit. The cartridge may then be inserted into the device. Alternatively, the sample may be provided directly to the device, which may or may not utilize the cartridge. The cartridge may comprise one or more reagents, which may be used in the operation of the device. The reagents may be self-contained within the cartridge. Reagents may be provided to a device through a cartridge without requiring reagents to be pumped into the device through tubes and/or tanks of buffer. Alternatively, one or more reagents may already be provided onboard the device.

A device may be capable of receiving a single type of sample, or multiple types of samples. The device may be capable of processing the single type of sample or multiple types of samples. In some instances, a single bodily fluid collector may be utilized. Alternatively, multiple and/or different bodily fluid collectors may be utilized.

A bodily fluid collector or any other collection mechanism can be disposable. For example, a bodily fluid collector can be used once and disposed. A bodily fluid collector can have one or more disposable components. Alternatively, a bodily fluid collector can be reusable. The bodily fluid collector can be reused any number of times. In some instances, the bodily fluid collector can include both reusable and disposable components.

To achieve any of these operations, SOCA may perform data integration, pattern recognition and machine learning. For example, to compute the optimal combination of tests to combine on a set of test cartridges that reduce the number of cartridges required to fulfill patient test orders, SOCA may integrate data from any one or more of the following areas: a) requirements for each test consistent with validation criteria (i.e., chemistry and sample processing requirements) b) device design specifications, including component performance characteristics, and capacity c) historical test order data, indicating frequency of test orders, time of test orders, and geographic location of test orders, and/or d) costs associated with each test and cartridge.

Based on these and/or other data, SOCA can compute an efficient combination of tests to combine on a set of test cartridges. The efficient combination may be an improved combination based on a value (or goal) of the user or subject or patient, or the needs of the particular tests to be run. The efficient combination may also and/or alternatively be called an optimal combination of tests. Note that optimal or improved cartridge solutions can be calculated for specific geographic regions given possible different clinical testing patterns. Moreover, the cartridge solutions can be updated based on any changes in the operating conditions, such as new test order data, changes in the device, or addition tests to the test menu.

Protocol Execution Engine (PREE)

The protocol execution engine (PREE) can solve for optimal (or at least improved) device protocols and instructs the device how to execute these protocols. Provided herein is a method for conducting medical tests (also called assays herein) on the device by solving in real-time for a sequence of steps and operations (i.e., a protocol) in order to complete all required assays on all patient samples in the most efficient (or in a more efficient) manner given all assay specifications and all device specifications and/or constraints. Efficiency may be determined in many alternative manners, or as a combination of the same according to device inputs, values, or user needs. Efficiency may be based on the values of timing, energy consumption, first-in-first-out principles, other efficiency goals, and/or cost, at least. Other forms of efficiency may be built into the PREE according to the needs of the user of the device, regulatory requirements, or other values. As used herein, the term "optimized" or forms of the same word may be used to mean the most efficient way of performing the subtasks in the device, or may mean a more efficient way or performing the subtasks of the device according to one or more of several values (e.g. time, cost, energy, for nonlimiting example) as compared to performing the subtasks in a non-integrated manner (for example, serially, or sequentially, or without sharing device stations). As used herein a subtask may alternatively be called a step or a task, or vice versa.

In order to calculate the required test cartridges and the optimal device protocol in real time, PREE can integrate data in real time across at least the following areas as communicated to it by SOCA: requirements for each test consistent with validation criteria (i.e., chemistry and sample processing requirements), real-time inventory of available on-sight test cartridges, test cartridge specifications (i.e., the cartridge layout) indicating which tests are on each cartridge and where each test reagent is located on the cartridge, device design specifications, including component performance characteristics and capacity, real time status of the device, and new patient test order or orders, including relevant reflex testing requests and any relevant patient history (such as prior testing results, electronic medical records, etc.)

One component of certain embodiments of methods, devices, and/or systems described herein is the definition of test specifications (which may alternatively be called constraints). Each test may be defined with respect to a set of required subtasks and their interdependencies. For example, one constraint may be the minimal and maximal incubation time for a given test. Another constraint is that certain assay steps (or subtask) must be performed after other steps (or subtasks). Another constraint is the sample dilution required for the test. The test result is only valid when all test steps are completed in accordance with such constraints. As a result, each time the test is run on the device, a novel protocol may be solved for and implemented that meets all assay constraints.

The exact test protocol solved for and implemented will depend on the device resources, the combination of tests ordered, and any additional tests already running on the device. Moreover, new samples introduced into the device could alter the planned execution of tests already begun on the device while ensuring performance consistent with validation criteria.

A test protocol may be defined by the time sequence of subtasks (or steps or tasks) with specific device resources assigned to each subtask. Device resources include all device components that are physically involved in processing the tests. For example, device resources may include one or more pipettes and a centrifuge. Each resource is further characterized by its operating characteristics and capabilities. For example, a centrifuge may be able to process "n" samples at one time and separation of the plasma from the red cells may take "x" seconds when spun at a given rate.

A device may have a display and/or user interface. Examples of displays and/or user interfaces may include a touchscreen, video display, LCD screen, CRT screen, plasma screen, light sources (e.g., LEDs, OLEDs), keys, mouse, button, knobs, sliding mechanisms, joystick, audio components. Any description herein of a display and/or user interface may apply to any type of display and/or user interface. A display may provide information to an operator of the device. A user interface may provide information and/or receive information from the operator.

The user interface may be provided on a housing of the device. It may be integrated into the housing of a device. In some embodiments, the user interface may form an outer layer of the housing of the device. The user interface may be visible when viewing the device. The user interface may be selectively viewable when operating the device.

The user interface may display information relating to the operation of the device and/or data collected from the device. The user interface may display information relating to a protocol that may run on the device. The user interface may include information relating to a protocol provided from a source external to the device, or provided from the device. The user interface may display information relating to a subject and/or health care access for the subject. For example, the user interface may display information relating to the subject identity and medical insurance for the subject. The user interface may display information relating to scheduling and/or processing operation of the device.

The user interface may be capable of receiving one or more input from a user of the device. For example, the user interface may be capable of receiving instructions about one or more assay or procedure to be performed by the device. The user interface may receive instructions from a user about one or more sample processing step to occur within the device. The user interface may receive instructions about one or more analyte to be tested for. The user interface may receive a priority for the PREE to use in optimization of the subtask list schedule. The priority may comprise any one or more of a goal, a value, a particular assay to be prioritized, time, cost, or energy.

Identifying information about the subject and/or additional information relating to the subject may be stored in the device and/or transmitted to an external device or cloud computing infrastructure. Such information may be useful in analyzing data relating to a sample collected from the subject. Such information may also be useful for determining whether to proceed with sample processing.

The user interface and/or sensors may be capable of collecting information relating to the subject or the environment. For example, the device may collect information through a screen, thermal sensor, optical sensor, motion sensor, depth sensor, pressure sensor, electrical characteristic sensor, acceleration sensor, any other type of sensor described herein or known in the art. In one example, the optical sensor may be a multi-aperture camera capable of collecting a plurality of images and calculating a depth therefrom. An optical sensor may be any type of camera or imaging device as described elsewhere herein. The optical sensor may capture one or more static images of the subject and/or video images of the subject.

In some embodiments, the pipette is a positive displacement pipette. A positive displacement pipette may permit the dispensing or aspiration of a fluid with a high degree of accuracy and precision. For example, using a positive displacement pipette, the amount of fluid dispensed or aspirated may be controlled to within about 1 mL, 500 um, 300 um, 200 um, 150 um, 100 um, 50 um, 30 um, 10 um, 5 um, 1 um, 500 mL, 300 mL, 100 mL, 50 mL, 10 mL, 5 mL, 1 mL, 500 pL, 100 pL, 10 pL, or 1 pL.

A positive displacement pipette may have a low coefficient of variation (CV). For example, the CV may be 10% or less, 8% or less, 5% or less, 3% or less, 2% or less, 1.5% or less, 1% or less, 0.7% or less, 0.5% or less, 0.3% or less, 0.1% or less, 0.05% or less, 0.01% or less, 0.005% or less, or 0.001% or less.

A positive displacement pipette may cause the fluid to be dispensed and/or aspirated by trapping a fixed amount of the fluid, and discharging it by altering the volume of the cavity in which the fluid is trapped. The positive displacement pipette may trap the fluid without also trapping air. The tip of the positive displacement pipette may include a plunger that may directly displace the fluid. In some embodiments, the tip of the positive displacement pipette may function as a microsyringe, where the internal plunger may directly displace the liquid.

A positive displacement pipette may have a variety of formats. For example, the plunger may slide up and down based on various actuation mechanisms.

In some embodiments, the pipette is an air displacement pipette. An air displacement pipette may permit the dispensing or aspiration of a fluid with a high degree of accuracy and precision. For example, using an air displacement pipette, the amount of fluid dispensed or aspirated may be controlled to within about 3 mL, 2 mL, 1.5 mL, 1 mL, 750 micrometer ("um", also "µm" herein), 500 um, 400 um, 300 um, 200 um, 150 um, 100 um, 50 um, 30 um, 10 um, 5 um, 1 um, 500 mL, 300 mL, 100 mL, 50 mL, 10 mL, or 1 mL. In some embodiments, a positive displacement pipette may have a higher degree of accuracy and/or precision than an air displacement pipette.

An air displacement pipette may have a low coefficient of variation (CV). For example, the CV may be 15% or less, 12% or less, 10% or less, 8% or less, 5% or less, 3% or less, 2% or less, 1.5% or less, 1% or less, 0.7% or less, 0.5% or less, 0.3% or less, or 0.1% or less.

An air displacement pipette may cause the fluid to be dispensed and/or aspirated by generating a vacuum by the travel of a plunger within a fluid-tight sleeve. As the plunger moves upward, a vacuum is created in the space left vacant by the plunger. Air from the tip rises to fill the space left vacant. The tip air is then replaced by the fluid, which may be drawn into the tip and available for transport and dispensing elsewhere. In some embodiments, air displacement pipettes may be subject to the changing environment, such as temperature. In some embodiments, the environment may be controlled in order to provide improved accuracy.

The air displacement pipette may have a variety of formats. For example, the air displacement pipette may be adjustable or fixed. The tips may be conical or cylindrical. The pipettes may be standard or locking. The pipettes may be electronically or automatedly controlled, or may be manual. The pipettes may be single channeled or multi-channeled.

Multiple types of pipettors and/or tips may be provided. One or more positive displacement pipettor and/or one or more air displacement pipettors may be utilized.

A centrifuge may be configured to accept one or more sample, or a portion of a sample. A centrifuge may be used for separating and/or purifying materials of differing densities. Examples of such materials may include viruses, bacteria, cells, proteins, environmental compositions, or other compositions.

A centrifuge may have one or more cavity that may be configured to accept a sample. The cavity may be configured to accept the sample directly within the cavity, so that the sample may contact the cavity wall. Alternatively, the cavity may be configured to accept a sample vessel that may contain the sample therein. Any description herein of cavity may be applied to any configuration that may accept and/or contain a sample or sample container. For example, cavities may include indentations within a material, bucket formats, protrusions with hollow interiors, members configured to interconnect with a sample container. Any description of cavity may also include configurations that may or may not have a concave or interior surface. A sample vessel of the centrifuge may have an interior surface and an exterior surface. A sample vessel may have at least one open end configured to accept the sample. The open end may be closeable or sealable. The sample vessel may have a closed end.

A centrifuge may have one or more, two or more, three or more, four or more, five or more, six or more, eight or more, 10 or more, 12 or more, 15 or more, 20 or more, 30 or more, or 50 or more cavities configured to accept a sample or sample vessel.

In some embodiments, the centrifuge may be configured to accept a small volume of sample. In some embodiments, the cavity and/or sample vessel may be configured to accept a sample volume of 1,000 uL or less, 500 uL or less, 250 uL or less, 200 uL or less, 175 uL or less, 150 uL or less, 100 uL or less, 80 uL or less, 70 uL or less, 60 uL or less, 50 uL or less, 30 uL or less, 20 uL or less, 15 uL or less, 10 uL or less, 8 uL or less, 5 uL or less, 1 uL or less, 500 mL or less, 300 uL or less, 100 mL or less, 50 mL or less, 10 mL or less, or 1 mL or less.

A centrifuge may be configured to rotate about an axis of rotation. A centrifuge may be able to spin at any number of rotations per minute. For example, a centrifuge may spin up to a rate of 100 rpm, 1,000 rpm, 2,000 rpm, 3,000 rpm, 5,000 rpm, 7,000 rpm, 10,000 rpm, 12,000 rpm, 15,000 rpm, 17,000 rpm, 20,000 rpm, 25,000 rpm, 30,000 rpm, 40,000 rpm, 50,000 rpm, 70,000 rpm, or 100,000 rpm. At some points in time, a centrifuge may remain at rest, while at other points in time, the centrifuge may rotate. A centrifuge at rest is not rotating. A centrifuge may be configured to rotate at variable rates. In some embodiments, the centrifuge may be controlled to rotate at a desirable rate. In some embodiments, the rate of change of rotation speed may be variable and/or controllable.

In some embodiments, the axis of rotation may be vertical. Alternatively, the axis of rotation may be horizontal, or may have any angle between vertical and horizontal (e.g., about 15, 30, 45, 60, or 75 degrees). In some embodiments, the axis of rotation may be in a fixed direction. Alternatively, the axis of rotation may vary during the use of a device. The axis of rotation angle may or may not vary while the centrifuge is rotating.

A centrifuge may comprise a base. The base may have a top surface and a bottom surface. The base may be configured to rotate about the axis of rotation. The axis of rotation may be orthogonal to the top and/or bottom surface of the base. In some embodiments, the top and/or bottom surface of the base may be flat or curved. The top and bottom surface may or may not be substantially parallel to one another.

In some embodiments, the base may have a circular shape. The base may have any other shape including, but not limited to, an elliptical shape, triangular shape, quadrilateral shape, pentagonal shape, hexagonal shape, or octagonal shape.

The base may have a height and one or more lateral dimension (e.g., diameter, width, or length). The height of the base may be parallel to the axis of rotation. The lateral dimension may be perpendicular to the axis of rotation. The lateral dimension of the base may be greater than the height. The lateral dimension of the base may be 2 times or more, 3 times or more, 4 times or more, 5 times or more, 6 times or more, 8 times or more, 10 times or more, 15 times or more, or 20 times or more greater than the height.

The centrifuge may have any size. For example, the centrifuge may have a footprint of about 200 $cm^2$ or less, 150 $cm^2$ or less, 100 $cm^2$ or less, 90 $cm^2$ or less, 80 $cm^2$ or less, 70 $cm^2$ or less, 60 $cm^2$ or less, 50 $cm^2$ or less, 40 $cm^2$ or less, 30 $cm^2$ or less, 20 $cm^2$ or less, 10 $cm^2$ or less, 5 $cm^2$ or less, or 1 $cm^2$ or less. The centrifuge may have a height of about 5 cm or less, 4 cm or less, 3 cm or less, 2.5 cm or less, 2 cm or less, 1.75 cm or less, 1.5 cm or less, 1 cm or less, 0.75 cm or less, 0.5 cm or less, or 0.1 cm or less. In some embodiments, the greatest dimension of the centrifuge may be about 15 cm or less, 10 cm or less, 9 cm or less, 8 cm or less, 7 cm or less, 6 cm or less, 5 cm or less, 4 cm or less, 3 cm or less, 2 cm or less, or 1 cm or less.

The centrifuge base may be configured to accept a drive mechanism. A drive mechanism may be a motor, or any other mechanism that may enable the centrifuge to rotate about an axis of rotation. The drive mechanism may be a brushless motor, which may include a brushless motor rotor and a brushless motor stator. The brushless motor may be an induction motor. The brushless motor rotor may surround the brushless motor stator. The rotor may be configured to rotate about a stator about an axis of rotation.

The base may be connected to or may incorporate the brushless motor rotor, which may cause the base to rotate about the stator. The base may be affixed to the rotor or may be integrally formed with the rotor. The base may rotate about the stator and a plane orthogonal to the axis of rotation of the motor may be coplanar with a plane orthogonal to the axis of rotation of the base. For example, the base may have a plane orthogonal to the base axis of rotation that passes substantially between the upper and lower surface of the base. The motor may have a plane orthogonal to the motor axis of rotation that passes substantially through the center of the motor. The base planes and motor planes may be substantially coplanar. The motor plane may pass between the upper and lower surface of the base.

A brushless motor assembly may include the rotor and stator. The motor assembly may include the electronic components. In some embodiments, the motor assembly does not extend beyond the base height. In other embodiments, the height of the motor assembly is no greater than 1.5 times the height of the base, than twice the height of the base, than 2.5 times the height of the base, than three times the height of the base, than four times the height of the base, or five times the height of the base. The rotor may be surrounded by the base such that the rotor is not exposed outside the base.

The motor assembly may effect the rotation of the centrifuge without requiring a spindle/shaft assembly. The rotor may surround the stator which may be electrically connected to a controller and/or power source.

In some embodiments, the cavity may be configured to have a first orientation when the base is at rest, and a second orientation when the base is rotating. The first orientation may be a vertical orientation and a second orientation may be a horizontal orientation. The cavity may have any orientation, where the cavity may be more than, less than, or about 0 degrees, 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, or 90 degrees from vertical and/or the axis of rotation. In some embodiments, the first orientation may be closer to vertical than the second orientation. The first orientation may be closer to parallel to the axis of rotation than the second orientation. Alternatively, the cavity may have the same orientation regardless of whether the base is at rest or rotating. The orientation of the cavity may or may not depend on the speed at which the base is rotating.

The centrifuge may be configured to accept a sample vessel, and may be configured to have the sample vessel at a first orientation when the base is at rest, and have the sample vessel at a second orientation when the base is rotating. The first orientation may be a vertical orientation and a second orientation may be a horizontal orientation. The sample vessel may have any orientation, where the sample vessel may be more than, less than, or about 0 degrees, 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, or 90 degrees from vertical. In some embodiments, the first orientation may be closer to vertical than the second orientation. Alternatively, the sample vessel may have the same orientation regardless of whether the base is at rest or rotating. The orientation of the vessel may or may not depend on the speed at which the base is rotating.

Figure 2:
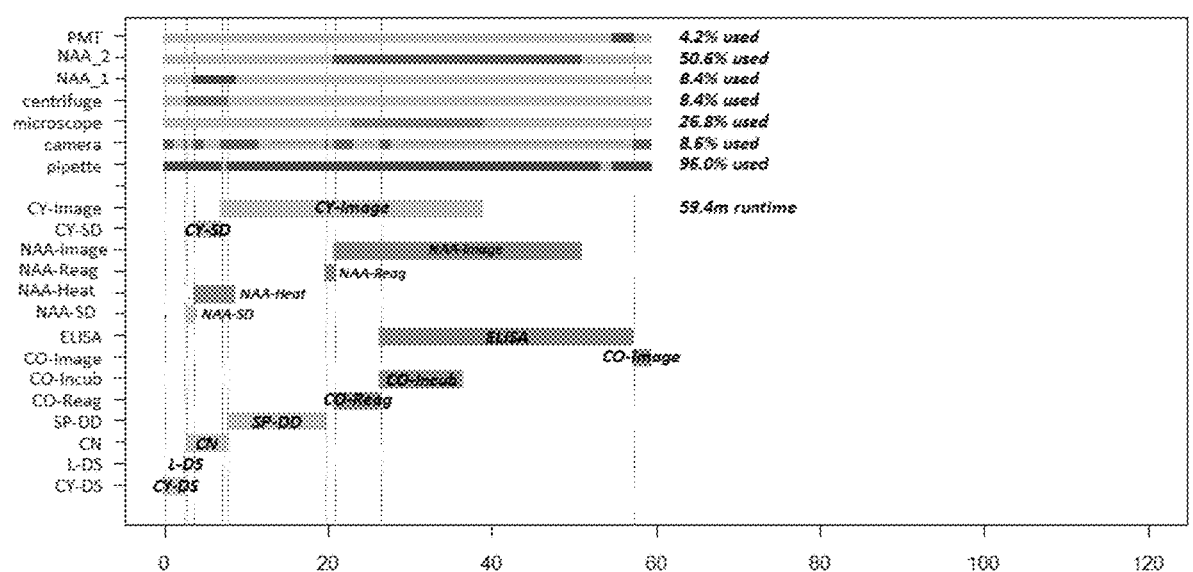
FIG. 2 depicts an embodiment in which a schedule of test subtasks of the test order is determined and the tests are completed according to the schedule in minimal time consistent with the requirements for each test within the test order.

FIG. 2 depicts an embodiment in which a schedule of test subtasks of the test order is determined and the tests are completed according to the schedule in minimal time consistent with the requirements for each test within the test order. As shown in FIG. 2, to complete a patient order of 46 tests: 26 colorimetry (CO), 14 cytometry (CY), 5 ELISA, 1 nucleic acid amplification (NAA) (e.g., a test utilizing PCR, LAMP, or other nucleic acid amplification method), a schedule of test steps are solved for which optimally complete the order in minimal time consistent with the requirements for each test. The utilization of the device resources is also calculated, as shown at the top of FIG. 2.

The device resources are plotted at the top left of FIG. 2, and in this example, include PMT, two nucleic acid tests (NAA_1, NAA_2), a centrifuge, a microscope, a camera, and a pipette. The usage of each of these resources is indicated in the dark colored bands corresponding to each resource, while idle time of the same device is indicated with a light colored band. The overall resource utilization for the duration of the testing time is expressed by a percentage on the right of each band corresponding to each resource of FIG. 2. Each subtask (or task) for each test type is plotted on the bottom of FIG. 2, where the start and end time of that subtask is shown by the horizontal bar corresponding to the test subtask. In FIG. 2, the subtasks include, from bottom to top of the figure: Cytometry: dispense sample, NAA: dispense sample, Centrifuge samples, Sample Preparation: Dilute and Dispense sample, Colorimetry: Dispense reagent, Colorimetry Incubate, Colorimetry Image, ELISA, LAMP: SD, NAA: Heat, NAA: Reag, NAA-Image, Cytometry: SD, Cytometry-Image. Certain subtasks use the same resource, such as the pipette for at least the dispensing of the sample, reagents, dilution of samples. Some resources must be done before others, such as sample dispensing, dilution and dispensing, reagent dispensing, at least. Some resources can be used simultaneously, however, such as the microscope and the camera and the pipette, at least.

Additionally, or alternatively, any of the resource usages can be a measure of efficiency, or the combination of any of resource usages may be the efficiency measure that the algorithm uses to provide a optimized schedule of subtasks.

By fully modeling the device in silico, the invention also enables one to test the device virtually by evaluating aspects of the device performance implementation. This approach enables one to test the implications of different device designs under consideration. The invention also enables one to search over all possible device design solutions to further optimize the device, considering both performance and costs implications. Finally, this analysis can be used to ensure that the device will operate in a manner consistent with the validation criteria.

A sample may be received by the device. Examples of samples may include various fluid samples. In some instances, the sample may be a bodily fluid sample from the subject. The sample may be an aqueous or gaseous sample. The sample may be a gel. The sample may include one or more fluid component. In some instances, solid or semi-solid samples may be provided. The sample may include tissue collected from the subject. The sample may be a biological sample. The biological sample may be a bodily fluid, a secretion, and/or a tissue sample. Examples of biological samples may include but are not limited to, blood, serum, saliva, urine, gastric and digestive fluid, tears, stool, semen, vaginal fluid, interstitial fluids derived from tumorous tissue, ocular fluids, sweat, mucus, earwax, oil, glandular secretions, or spinal fluid. The sample may be provided from a human or animal. The sample may be provided from a mammal, vertebrate, such as murines, simians, humans, farm animals, sport animals, or pets. The sample may be collected from a living or dead subject.

The sample may be collected fresh from a subject or may have undergone some form of pre-processing, storage, or transport. The sample may be provided to a device from a subject without undergoing intervention or much time. The subject may contact the device to provide the sample.

A subject may provide a sample, and/or the sample may be collected from a subject. A subject may be a human or animal. The subject may be a mammal, vertebrate, such as murines, simians, humans, farm animals, sport animals, or pets. The subject may be living or dead. The subject may be a patient, clinical subject, or pre-clinical subject. A subject may be undergoing diagnosis, treatment, and/or disease prevention. The subject may or may not be under the care of a health care professional.

A sample may be collected from the subject by puncturing the skin of the subject, or without puncturing the skin of the subject. A sample may be collected through an orifice of the subject. A tissue sample may be collected from the subject, whether it be an internal or external tissue sample. The sample may be collected from any portion of the subject including, but not limited to, the subject's finger, hand, arm, shoulder, torso, abdomen, leg, foot, neck, or head.

In some embodiments, the sample may be an environmental sample. Examples of environmental samples may include air samples, water samples, soil samples, or plant samples. Environmental samples may be collected from a location.

Additional samples may include food products, beverages, manufacturing materials, textiles, chemicals, or any other samples.

One type of sample may be accepted and/or processed by the device. Alternatively, multiple types of samples may be accepted and/or processed by the device. For example, the device may be capable of accepting one or more, two or more, three or more, four or more, five or more, six or more, seven or more, eight or more, nine or more, ten or more, twelve or more, fifteen or more, twenty or more, thirty or more, fifty or more, or one hundred or more types of samples. The device may be capable of accepting and/or processing any of these numbers of sample types simultaneously and/or at different times. For example, the device may be capable of preparing, assaying and/or detecting one or multiple types of samples.

Any volume of sample may be provided from the subject or from another source. Examples of volumes may include, but are not limited to, about 10 mL or less, 5 mL or less, 3 mL or less, 1 µL or less, 500 µL or less, 300 µL or less, 250 µL or less, 200 µL or less, 170 µL or less, 150 µL or less, 125 µL or less, 100 µL or less, 75 µL or less, 50 µL or less, 25 µL or less, 20 µL or less, 15 µL or less, 10 µL or less, 5 µL or less, 3 µL or less, 1 µL or less, 500 mL or less, 250 mL or less, 100 mL or less, 50 mL or less, 20 mL or less, 10 mL or less, 5 mL or less, 1 mL or less, 500 pL or less, 100 pL or less, 50 pL or less, or 1 pL or less. The amount of sample may be about a drop of a sample. The amount of sample may be about 1-5 drops of sample, 1-3 drops of sample, 1-2 drops of sample, or less than a drop of sample. The amount of sample may be the amount collected from a pricked finger or fingerstick. Any volume, including those described herein, may be provided to the device.

A device may be configured to accept a single sample, or may be configured to accept multiple samples. In some instances, the multiple samples may or may not be multiple types of samples. For example, in some instances a single device may handle a single sample at a time. For example, a device may receive a single sample, and may perform one or more sample processing step, such as a sample preparation step, assay step, and/or detection step with the sample. The device may complete processing a sample, before being able to accept a new sample.

In another example, a device may be capable of handling multiple samples simultaneously. In one example, the device may receive multiple samples simultaneously. The multiple samples may or may not be multiple types of samples. Alternatively, the device may receive samples in sequence. Samples may be provided to the device one after another, or may be provided to device after any amount of time has passed. A device may be capable of beginning sample processing on a first sample, receiving a second sample during said sample processing, and process the second sample in parallel with the first sample. The first and second sample may or may not be the same type of sample. The device may be able to parallel process any number of samples, including but not limited to more than, less than, and/or equal to about one sample, two samples, three samples, four samples, five samples, six samples, seven samples, eight samples, nine samples, ten samples, eleven samples, twelve samples, thirteen samples, fourteen samples, fifteen samples, sixteen samples, seventeen samples, eighteen samples, nineteen samples, twenty samples, twenty-five samples, thirty samples, forty samples, fifty samples, seventy samples, one hundred samples.

When a plurality of samples are being processed simultaneously, the samples may begin and/or end processing at any time. The samples need not begin and/or end processing at the same time. A first sample may have completed processing while a second sample is still being processed. The second sample may begin processing after the first sample has begun processing. As samples have completed processing, additional samples may be added to the device. In some instances, the device may be capable of running continuously with samples being added to the device as various samples have completed processing.

The multiple samples may be provided simultaneously. The multiple samples may or may not be the same type of sample. For example, multiple sample collection units may be provided to a device. For example, one, two or more lancets may be provided on a device or may be brought into fluid communication with a sample collection unit of a device. The multiple sample collection units may receive samples simultaneously or at different times. Multiple of any of the sample collection mechanisms described herein may be utilized. The same type of sample collection mechanisms, or different types of sample collection mechanisms may be utilized.

The multiple samples may be provided in sequence. In some instances, multiple sample collection units, or single sample collection units may be used. Any combination of sample collection mechanisms described herein may be utilized. A device may accept one sample at a time, two samples at a time, or more. Samples may be provided to the device after any amount of time has elapsed.

In one example PREE, the following four tests are ordered: 1) Hematocrit (assay method: centrifugation) 2) H3N2 viral load (assay method: nucleic acid amplification) 3) Glucose (assay method: colorimetry) and 4) CRP (assay method: immunoassay (ELISA).

As indicated above, each of these four tests are performed with different assay methods. Moreover, each test has very specific and unique requirements with respect to its assay protocol and device resources required to complete that assay. Further, certain resources in this example cannot be used by more than one assay without cross-contamination. Note that while this example includes only 4 tests, each of a different type, the methodology demonstrated here may be applied similarly to orders of any number of tests of any combination of test types with different device configurations.

One approach to solving this problem would be to design the device such that each test is ensured to have a complete and independent set of resources to conduct that test. This approach would be a simple serial approach without resource sharing, however, this solution would also require many more device resources and does not scale well with increasing test orders. Moreover, it is not flexible to the addition of new test offerings or other system/device changes.

Another approach would allow for resource sharing across tests, but would perform each test in series, i.e., the device would not parallel process. This approach is simple to implement, but suboptimal with respect to test run times.

The flexible approach described herein and employed by PREE solves for the optimal (or more efficient as compared to the other approaches described according to one or more values) protocol by considering the device resources (such as pipettes, cameras, tips/tubes/wells, etc.) and the requirements for each test ordered. The optimal protocol solutions are found to be highly parallelized.

As an input to PREE, a list of subtasks (or tasks) may be generated based on the tests (input processes) ordered (see Table 1). The subtask list includes a list of constraints and requirements for each subtask, for example, the duration of each subtask, the type of device resources required to complete that subtask, and the subtasks that are able to be started after that subtask is done (i.e., the successor subtasks). This subtask list alone may not specify the ordering of the subtasks, nor which specific resource is being used to complete that subtask.

| Task # | Name | Calculated Duration | Resources Required | Successor subtasks |
|---|---|---|---|---|
| 1 | Hematocrit: Dispense Sample | 11 | Pipette, Camera | 3, 13 |
| 2 | H3N2: Dispense | 11 | Pipette, Camera | 3, 9 |
| 3 | Centrifuge | 300 | Centrifuge | 4 |
| 4 | Glucose and CRP: Dilute and Dispense | 390 | Pipette, Camera | 5, 8 |
| 5 | Glucose: Dispense Reagents | 56 | Pipette, Camera | 6 |
| 6 | Glucose: Incubate | 600 | | 7 |
| 7 | Glucose: Read | 5 | Pipette, Camera | |
| 8 | CRP: Dispense Reagents, Incubate, and Read | 1389 | Pipette, Camera, pmt | |
| 9 | H3N2: Prepare Sample | 56 | Pipette, Camera | 10 |
| 10 | H3N2: Heat | 300 | NAA block 1 | 11 |
| 11 | H3N2: Dispense Reagents | 66 | Pipette, Camera | 12 |
| 12 | H3N2: Incubate and Read | 1805 | NAA block 2 | |
| 13 | Hematocrit: Prepare Sample | 56 | Pipette, Camera | 14 |
| 14 | Hematocrit: Image and Analyze | | microscope | |

Using this subtask list in combination with a specification of the device resources, PREE solves the constrained scheduling problem by finding the optimal ordering of the subtasks and assignments of resources to each subtask in order to complete the entire test order in minimal time consistent with all specified constraints.

There are a variety of methods that can be used to solve this problem. The algorithm implemented uses a method similar to a discrete event simulation—that is, each decision about an operation of the device is represented as a discrete event that changes the state of the system. Each possible system state is represented by the following variables: 1. Running time: time to reach the current state from the starting point 2. Solution state: the order of completed subtasks, their starting times, and resource allocations 3. Subtask state: which subtasks are remaining to run, currently running, and complete and 4. Resource state: which resources are available, in use, or unavailable due to certain types of previous use.

For each state, the algorithm can generate a list of the heuristically reasonable device operations that can be performed next, based on the current subtask (or task) state, resource state, subtask, subtask resource requirements, and subtask ordering requirements. Then new states are generated based on the list. This process continues until it has generated the state or set of states in which all the subtasks and/or subtasks are completed, at which point it produces the solution state(s) corresponding to the shortest running time as the output. Alternatively, the solution state(s) may correspond to another efficiency value or measure, such as energy, cost, need for certain tests to occur first, or other values or measures.

Furthermore, a variety of methods to increase the speed the algorithm may be implemented, such as by excluding states which can be determined to be suboptimal.

Figure 3:
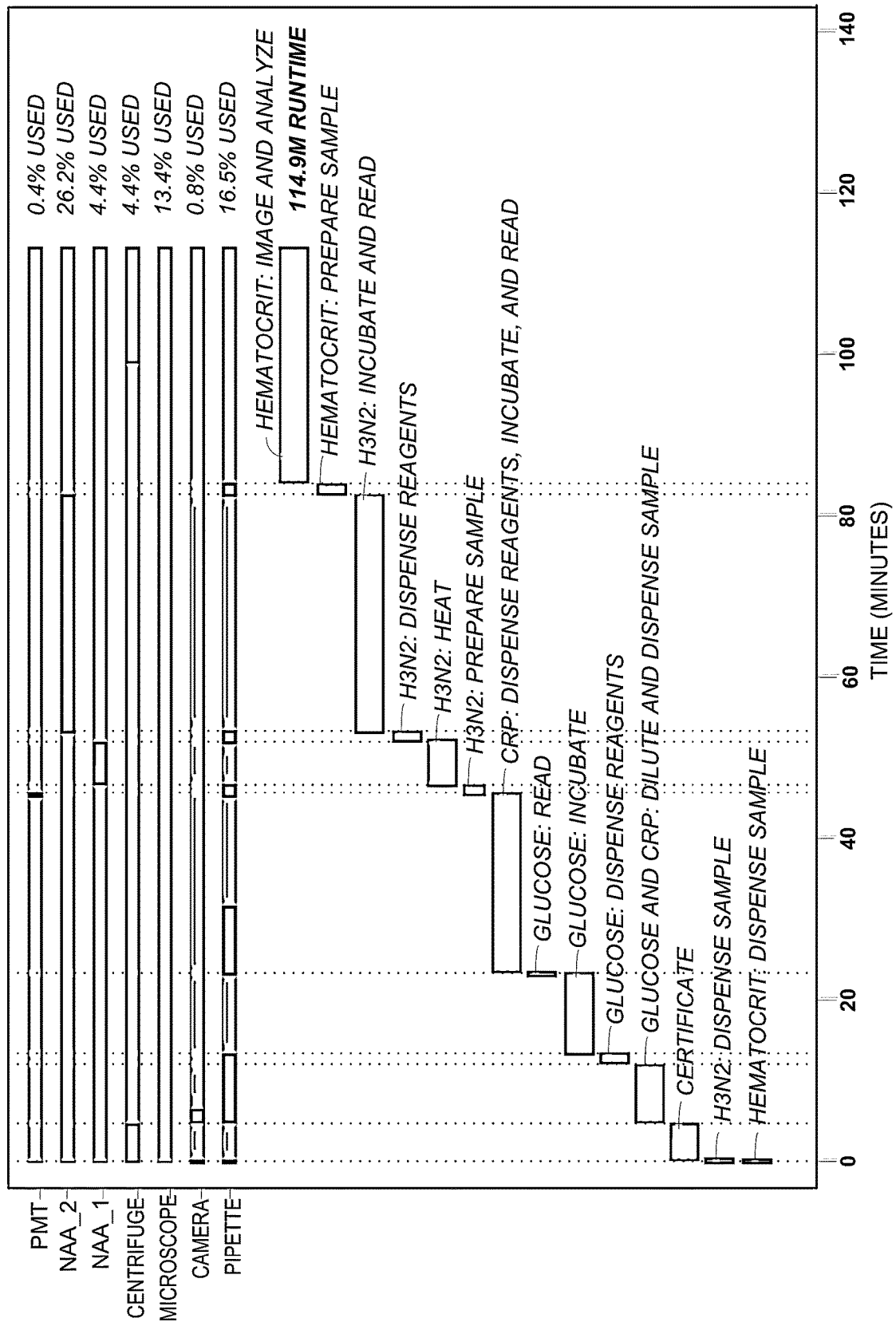
FIG. 3 depicts an example testing schedule that is not optimized when compared the testing schedule to FIG. 4.
Figure 4:
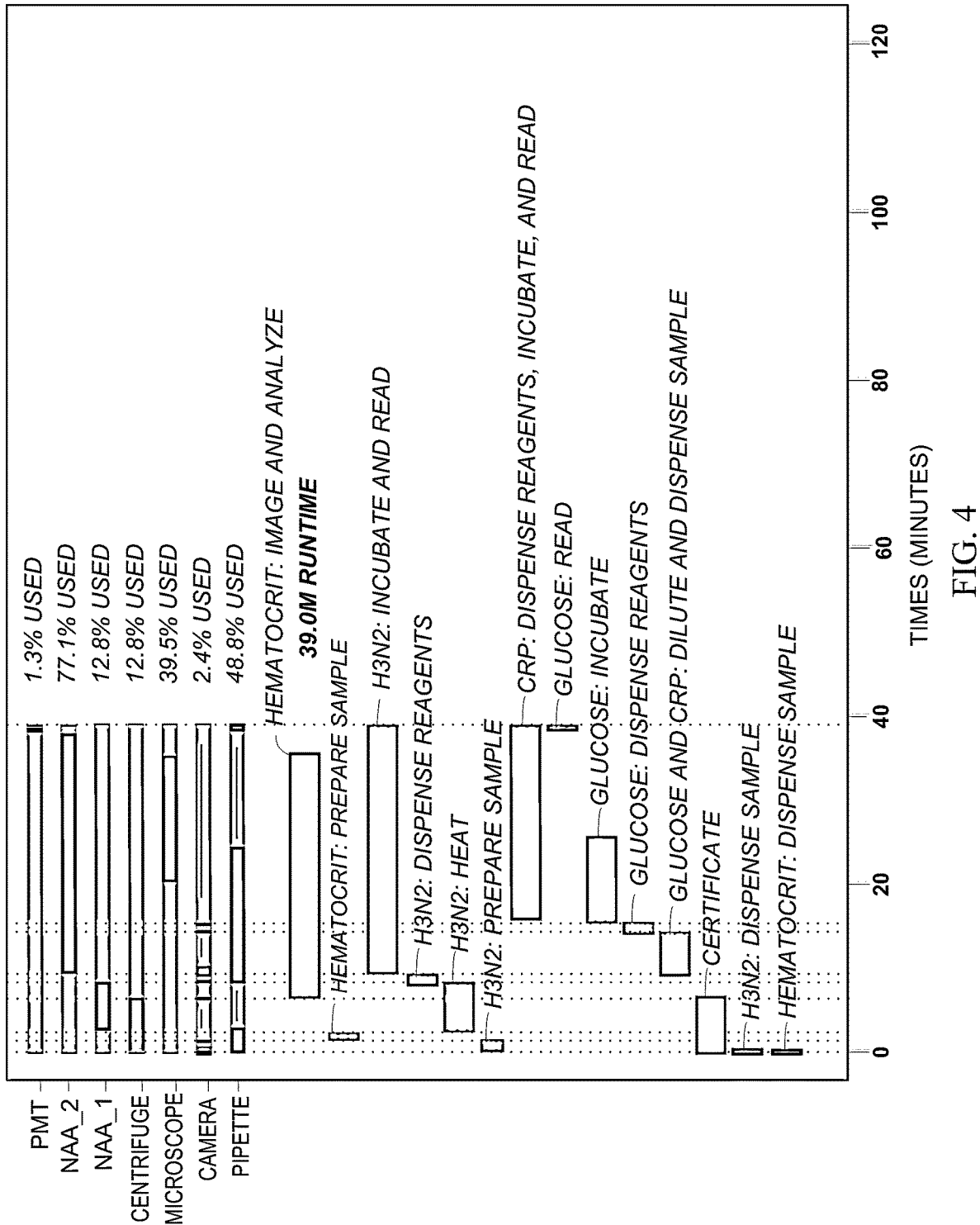
FIG. 4 depicts a solution computed by PREE that is optimized to minimize the overall testing run time while meeting each test constraint and not over allocating any of the device resources.

FIG. 3 depicts an example testing schedule that is not optimized, while FIG. 4 depicts a solution computed by PREE that is optimized to minimize the overall testing run time while meeting each test constraint and not over allocating any of the device resources. As shown by comparing these two Figures, for example, PREE reduces the run time by 66% compared to the unoptimized testing protocol. In some embodiments, PREE reduces the run time by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, about 5% to about 90%, about 10% to about 75%, about 25% to about 75%, about 40% to about 75%, about 50% to about 70%, about 60% to about 70%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, 5% to 90%, 10% to 75%, 25% to 75%, 40% to 75%, 50% to 70%, and 60% to 70%.

The unoptimized schedule where test subtasks (or tasks) are performed serially is shown in FIG. 3, completing in 114.9 minutes. The tests (or assays or input processes) of FIG. 3 include: Hematocrit, H3N2, Glucose, and CRP. The device resources for these tests are plotted at the top of FIG. 3, where the dark-colored band corresponding to the resource listed at the left of the plot (e.g. PMT, NAA_2, NAA_1, centrifuge, microscope, camera, and pipette), indicates when the resource is used, and the lighter band indicates idle time of the corresponding resource. The overall resource utilization is low, as expressed by the percentages to the right of the resource plots of FIG. 3. Each subtask (or task) is plotted on the bottom of FIG. 3, where the start and end time of that subtask is shown by the horizontal bar through the subtask name. In this example, the subtasks include, from bottom to top of FIG. 3: Hematocrit: Dispense Sample, H3N2: Dispense Sample, Centrifuge, Glucose and CRP: Dilute and Dispense Sample, Glucose: Dispense Reagents, Glucose: Incubate, Glucose: Read, CRP: Dispense Reagents, Incubate and Read, H3N2: Prepare Sample, H3N2: Heat, H3N2: Dispense Reagents, H3N2: Incubate and Read, Hematocrit: Prepare Sample, and Hematocrit: Image and Analyze.

FIG. 4 depicts an optimized schedule using the devices, methods, algorithms, and/or systems described herein wherein subtasks (or tasks) are performed in parallel consistent with the test constraints, completing in 39 minutes. The device resources in FIG. 4 are plotted at the top where the dark-colored band indicates when the resource is used, and the lighter band indicates idle time. The overall resource utilization is high, as expressed by the percentages in the top right of FIG. 4. Each subtask is plotted on the bottom of FIG. 4, where the start time and the end time of that subtask is shown by the horizontal bar. FIG. 4 has the same resources available to the assays being performed as in FIG. 3, and the same tests (CRP, Glucose, Hematocrit, and H3N2) are ordered and have the same subtasks as in FIG. 3. From bottom of FIG. 4 to the top, the subtasks include: Hematocrit: Dispense Sample, H3N2: Dispense Sample, Centrifuge, Glucose and CRP: Dilute and Dispense Sample, Glucose: Dispense Reagents, Glucose: Incubate, Glucose: Read, CRP: Dispense Reagents, Incubate and Read, H3N2: Prepare Sample, H3N2: Heat, H3N2: Dispense Reagents, H3N2: Incubate and Read, Hematocrit: Prepare Sample, and Hematocrit: Image and Analyze.

Nevertheless, the optimization based on time as performed in this example and shown in FIG. 4 results in a much shorter duration of the total set of assays in FIG. 4 than in FIG. 3. The schedule of subtasks of FIG. 4 takes 39 minutes, which used the flexible scheduling algorithm described herein to generate an ordered schedule of subtasks. In contrast, the non-optimized schedule of subtasks of FIG. 3 took 114.9 minutes for completion of the subtasks.

In some embodiments, another value such as energy, cost or another priority of the user is prioritized, using the devices, methods, algorithms, and/or systems described herein. In such embodiments, a different optimized schedule may result as compared to the optimized schedule when time or a different value is prioritized, or the same optimized schedule may result. In some embodiments, the same optimized schedule results when several of the values are prioritized. In some embodiments, two or more values are be prioritized to create an optimized schedule. In some embodiments, the values may be ranked in order of priority in order to generate an optimized schedule.

In some embodiments, PREE reduces the energy consumption of the device by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, about 5% to about 90%, about 10% to about 75%, about 25% to about 75%, about 40% to about 75%, about 50% to about 70%, about 60% to about 70%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, 5% to 90%, 10% to 75%, 25% to 75%, 40% to 75%, 50% to 70%, and 60% to 70%.

In some embodiments, PREE reduces the cost of assay performance by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, about 5% to about 90%, about 10% to about 75%, about 25% to about 75%, about 40% to about 75%, about 50% to about 70%, about 60% to about 70%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, 5% to 90%, 10% to 75%, 25% to 75%, 40% to 75%, 50% to 70%, and 60% to 70%.

In some embodiments, PREE improves the efficiency by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, about 5% to about 90%, about 10% to about 75%, about 25% to about 75%, about 40% to about 75%, about 50% to about 70%, about 60% to about 70%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, 5% to 90%, 10% to 75%, 25% to 75%, 40% to 75%, 50% to 70%, and 60% to 70%.

In some embodiments, a first-in-first-out (FIFO) principle is utilized as a value in generating the optimized schedule, alone or in combination with any other value such as overall time, energy, cost, etc. The FIFO principle may be applied to particular assays generally, or to any one or more particular subtasks of any assay, alone or in combination with any other value such as overall time, energy, cost, etc. The FIFO principle may be strict (FIFO no matter what) or non-strict (such as where other priorities or constraints conflict). FIFO describes the principle of a queue technique or servicing conflicting demands by ordering process by first-come, first-served (FCFS) behaviour: what comes in first is handled first, what comes in next waits until the first is finished, analogous to the behaviour of persons standing in line, where the persons leave the queue in the order they arrive, or waiting one's turn at a traffic control signal.

In some embodiments, a last-in-first-out (LIFO) principle is utilized as a value in generating the optimized schedule, alone or in combination with any other value such as overall time, energy, cost, etc. The LIFO principle may be applied to particular assays generally, or to any one or more particular subtasks of any assay, alone or in combination with any other value such as overall time, energy, cost, etc.

In some embodiments, a combination of FIFO and LIFO principles are prioritized in generating the optimized (i.e. efficient) schedule.

It is contemplated that in prioritizing a particular value (or combination of values) to generate the optimized (i.e. efficient) schedule, an individual assay may take longer than it would in the unoptimized (or inefficient) schedule. Alternatively, an individual assay may consume more energy from start to completion than it would in the unoptimized (or inefficient) schedule, or cost more, although it may not. For example the improved efficiency of FIG. 4, which prioritized time to completion of all assays, the Glucose assay took longer to complete (total elapsed time from the beginning of all assays to the end of the Glucose test) than in FIG. 3, about 48 minutes in FIG. 4 as compared to about 22 minutes in FIG. 3. This is not inconsistent with the improvements made and described herein, which may look at the overall efficiency of the various assays which are to be performed based on the priorities chosen or given, and not at one assay alone, unless such a view of the assays are so prioritized.

Provided herein is a computer-assisted method for scheduling biological or chemical assays comprising providing a set of input processes defining the biological or chemical assays to be performed by one or more devices, wherein an individual device comprises a plurality of stations, wherein said stations are selected from the group containing sample preparation stations, detection stations, and assay stations that provide consumable reagents and wherein at least one of said stations is a detection station. A station may comprise a resource or available resource. Example resources may include pipette, a reagent, a centrifuge, a NAA, a NAA block, magnets for magnetic separation, a filter, a heater, diluents, a thermal block, a cytometer, an energy source (e.g. x-ray, light source), assay units, reagent units, supports, or any resource used in any assay contemplated or described herein, or in any assay known to one of ordinary skill in the art in testing any biologic, medical, or chemical sample.

In accordance with some embodiments of the invention, a system may include one or more detection station. A device may include one or more detection station therein. For example, one or more detection station may be provided within a device. A system may comprise one or more detections stations. One, two, or more parts (or modules within) of a device may have a detection station therein. Alternatively, the detection station may be provided external to any portion of device.

The detection station may be used to detect a signal produced by at least one assay on the device. The detection station may be used to detect a signal produced at one or more sample preparation station in a device. The detection station may be capable of detecting a signal produced at any stage in a sample preparation or assay of the device.

In some embodiments, a plurality of detection stations may be provided. The plurality of detection stations may operate simultaneously and/or in sequence. The plurality of detection stations may include the same types of detection stations and/or different types of detection stations. The plurality of detection stations may operate on a synchronized schedule or independently of one another.

The detection station may be above the component from which the signal is detected, beneath the component from which the signal is detected, to the side of the component from which the signal is detected, or integrated into the component from which the signal is detected, or may have different orientation in relation to the component from which the signal is detected. For example, the detection station may be in communication with an assay unit. The detection station may be proximate to the component from which the signal is detected, or may be remote to the component from which the signal is detected. The detection station may be within one or more mm, one or more cm, one or more 10 s of cm from which the component from which the signal is detected.

The detection station may have a fixed position, or may be movable. The detection station may be movable relative to a component from which a signal is to be detected. For example, the detection station can be moved into communication with an assay unit or the assay unit can be moved into communication with the detection station. In one example, a sensor is provided to locate an assay unit relative to a detector when an assay is detected.

A detection station may include one or more optical or visual sensor. For example, a detection station may include microscopy, visual inspection, via photographic film, or may include the use of electronic detectors such as digital cameras, charge coupled devices (CCDs), super-cooled CCD arrays, or other detection device. An optical detector may further include non-limiting examples include a photodiode, photomultiplier tube (PMT), photon counting detector, or avalanche photo diode, avalanche photodiode arrays. In some embodiments a pin diode may be used. In some embodiments a pin diode can be coupled to an amplifier to create a detection device with a sensitivity comparable to a PMT. Some assays may generate luminescence as described herein. In some embodiments fluorescence or chemiluminescence is detected. In some embodiments a detection assembly could include a plurality of fiber optic cables connected as a bundle to a CCD detector or to a PMT array. The fiber optic bundle could be constructed of discrete fibers or of many small fibers fused together to form a solid bundle. Such solid bundles are commercially available and easily interfaced to CCD detectors. In some embodiments, fiber optic cables may be directly incorporated into assay or reagent units. For example, samples or tips as described elsewhere herein may incorporate fiber optic cables.

One or more detection stations may be configured to detect a detectable signal, which can be a luminescent signal, including but not limited to photoluminescence, electroluminescence, chemiluminescence, fluorescence, or phosphorescence. In some embodiments, one or more label may be employed during a chemical reaction. The label may permit the generation of a detectable signal. Methods of detecting labels are well known to those of skill in the art. Thus, for example, where the label is a radioactive label, means for detection may include a scintillation counter or photographic film as in autoradiography. Where the label is a fluorescent label, it may be detected by exciting the fluorochrome with the appropriate wavelength of light and detecting the resulting fluorescence by, for example, microscopy, visual inspection, via photographic film, by the use of electronic detectors such as digital cameras, charge coupled devices (CCDs) or photomultipliers and phototubes, or other detection device.

In some embodiments, imaging devices may be used, such as cameras. In some instances, cameras may utilize CCDs, CMOS, may be lensless cameras (e.g., Frankencamera), open-source cameras, or may utilize or any other visual detection technology known or later developed in the art. Cameras may include one or more feature that may focus the camera during use, or may capture images that can be later focused. In some embodiments, imaging devices may employ 2-d imaging, 3-d imaging, and/or 4-d imaging (incorporating changes over time). Imaging devices may capture static images. The static images may be captured at one or more point in time. The imaging devices may also capture video and/or dynamic images. The video images may be captured continuously over one or more periods of time. In some embodiments, the imaging device may utilize one or more component of the device in capturing the image. For example, the imaging device may use a tip and/or vessel to assist with capturing the image. The tip and/or vessel may function as an optic to assist in capturing an image.

Detection stations may also be capable of capturing audio signals. The audio signals may be captured in conjunction with one or more image. Audio signals may be captured and/or associated with one or more static image or video images. Alternatively, the audio signals may be captured separate from the image.

In one example, a PMT may be used as a detector. In some instances, count rates as low as 100 per second and count rates as high as 10,000,000 may be measurable. The linear response range of PMTs (for example, the range where count rate is directly proportional to number of photons per unit time) can be about 1000-3,000,000 counts per second. In an example, an assay has a detectable signal on the low end of about 200-1000 counts per second and on the high end of about 10,000-2,000,000 counts per second. In some instances for protein biomarkers, the count rate is directly proportional to alkaline phosphatase bound to the capture surface and also directly proportional to the analyte concentration.

In another example, a detector may include a camera that may be imaging in real-time. Alternatively, the camera may take snapshots at selected time intervals or when triggered by an event. Similarly, the camera may take video at selected time intervals or when triggered by an event. In some embodiments, the camera may image a plurality of samples simultaneously. Alternatively, the camera may image a selected view, and then move on to a next location for a different selected view.

A detection station may have an output that is digital and generally proportional to a detected signal, e.g., photons reaching the detector. Alternatively, the detection station may output an analog signal. The detectable range for exemplary detectors can be suitable to the detector being used.

The detection station may be capable of capturing and/or imaging a signal from anywhere along the electromagnetic spectrum. For example, a detection station may be capable of capturing and/or imaging visible signals, infra-red signals, near infra-red signals, far infra-red signals, ultraviolet signals, and/or other signals.

An optical detector can also comprise a light source, such as an electric bulb, incandescent bulb, electroluminescent lamp, laser, laser diode, light emitting diode (LED), gas discharge lamp, high-intensity discharge lamp. Other examples of light sources as provided elsewhere herein. The light source can illuminate a component in order to assist with detecting the results. For example, the light source can illuminate an assay in order to detect the results. For example, the assay can be a fluorescence assay or an absorbance assay, as are commonly used with nucleic acid assays. The detector can also comprise optics to deliver the light source to the assay, such as a lens, mirror, or fiber optics. The detector can also comprise optics to deliver light from an assay to a detection station.

An optical detection station may be used to detect one or more optical signal. For example, the detection station may be used to detect a reaction providing luminescence. The detection station may be used to detect a reaction providing fluorescence, chemiluminscence, photoluminescence, or electroluminescence. The detection station may be able to detect optical signals relating to color and/or intensity. For example, the detection station may be configured to detect selected wavelengths or ranges of wavelengths.

In some embodiments, the detection system may comprise non-optical detectors or sensors for detecting a particular parameter of a subject. Such sensors may include sensors for temperature, spectrophotometer, electrical signals, for compounds that are oxidized or reduced, for example, $O_2$, $H_2O_2$, and $I_2$, or oxidizable/reducible organic compounds.

Examples of temperature sensors may include thermometers, thermocouples, or IR sensors. The temperature sensors may or may not utilize thermal imaging. The temperature sensor may or may not contact the item whose temperature is to be sensed.

Examples of sensors for electrical properties may include sensors that can detect or measure voltage level, current level, conductivity, impedance, or resistance. Electrical property sensors may also include potentiometers or amperometric sensors.

In some embodiments, labels may be selected to be detectable by a detection station. The labels may be selected to be selectively detected by a detection station.

Any of the sensors may be triggered according to one or more schedule, or a detected event. In some embodiments, a sensor may be triggered when it receives instructions from one or more controller. A sensor may be continuously sensing and may indicate when a condition is sensed.

The one or more sensors may provide signals indicative of measured properties to any one or more of a SOCA, PREE and MVP. In some embodiments, the signals may be provided via a wired connection, or may be provided wirelessly. The controller may be provided on a system-wide level, group of device level, device level, or any other level.

The SOCA, PREE, and/or MVP may, based on the signals from the sensors, effect a change or maintain the state of a device or assay, for example: change in the temperature of a temperature control unit, modify the rotation speed of a centrifuge, determine a protocol to run on a particular assay sample, move a vessel and/or tip, and/or dispense and/or aspirate a sample. In some embodiments, based on the signals from the sensors, the SOCA, PREE, and/or MVP may maintain one or more condition of the device. One or more signal from the sensors may also result in determination of the current state of the device and track what actions have occurred, or are in progress. This may or may not affect the future actions to be performed by the device. In some embodiments, one or more signal from a single sensor may be considered for particular actions or conditions of the device. Alternatively, one or more signals from a plurality of sensors may be considered for particular actions or conditions of the device. The one or more signals may be assessed based on the moment they are provided. Alternatively, the one or more signals may be assessed based on information collected over time.

Assay units may be provided, and may have one or more characteristics as described further elsewhere herein. Assay units may be capable of accepting and/or confining a sample. The assay units may be fluidically isolated from one another. In some embodiments, assay units may have a tip format. An assay tip may have an interior surface and an exterior surface. The assay tip may have a first open end and a second open end. In some embodiments, assay units may be provided as an array. Assay units may be movable. In some embodiments, individual assay units may be movable relative to one another and/or other components of the device. In some instances, one or a plurality of assay units may be moved simultaneously. In some embodiments, an assay unit may have a reagent or other reactant coated on a surface. Alternatively, assay units may contain beads or other surfaces with reagents or other reactants coated thereon. In another example, assay units may contain beads or other surfaces formed of reagents or other reactants that may dissolve.

Reagent units may be provided and may have one or more characteristics as described further elsewhere herein. Reagent units may be capable of accepting and/or confining a reagent or a sample. Reagent units may be fluidically isolated from one another. In some embodiments, reagent units may have a vessel format. A reagent vessel may have an interior surface and an exterior surface. The reagent unit may have an open end and a closed end. In some embodiments, the reagent units may be provided as an array. Reagent units may be movable. In some embodiments, individual reagent units may be movable relative to one another and/or other components of the device. In some instances, one or a plurality of reagent units may be moved simultaneously. A reagent unit can be configured to accept one or more assay unit. The reagent unit may have an interior region into which an assay unit can be at least partially inserted.

A support may be provided for the assay units and/or reagent units. In some embodiments, the support may have a cartridge format or a microcard format. One or more assay/reagent unit support may be provided within a module. The support may be shaped to hold one or more assay units and/or reagent units. The support may keep the assay units and/or reagent units aligned in a vertical orientation. The support may permit assay units and/or reagent units to be moved or movable. Assay units and/or reagent units may be removed from and/or placed on a support. The device and/or system may incorporate one or more characteristics, components, features, or steps provided in U.S. Patent Publication No. 2009/0088336, which is hereby incorporated by reference in its entirety.

The method may comprise generating a list of one or more subtasks for each of the input processes, wherein each subtask is to be performed by a single station of the one or more devices. The method may comprise using a flexible scheduling algorithm to generate an ordered schedule of subtasks for the plurality of stations of the one or more devices such that when the subtasks are performed by the one or more devices, the input processes are completed in a manner more efficiently than if the input processes were performed sequentially by the plurality of stations. The method may further comprise instructing the stations to perform the associated subtasks according to the generated schedule of subtasks. Optionally, the method may comprise using at least one detection station to collect information regarding the status of an individual biological or chemical assay and utilizing said information to maintain or modify the schedule of subtasks.

In some embodiments, the set of input processes are completed in less than the time required if the set of input processes were performed sequentially. The set of input processes may be performed in less than 90% of the time required if the set of input processes were performed sequentially. The set of input processes may be performed, on average, in less than 90% of the time required if the set of input processes were performed sequentially. The set of input processes may be performed in less than 80% of the time required if the set of input processes were performed sequentially. The set of input processes may be performed, on average, in less than 80% of the time required if the set of input processes were performed sequentially. The set of input processes may be performed in less than 75% of the time required if the set of input processes were performed sequentially. The set of input processes may be performed, on average, in less than 75% of the time required if the set of input processes were performed sequentially. The set of input processes may be performed in less than 70% of the time required if the set of input processes were performed sequentially. The set of input processes may be performed, on average, in less than 70% of the time required if the set of input processes were performed sequentially. The set of input processes may be performed in less than 60% of the time required if the set of input processes were performed sequentially. The set of input processes may be performed, on average, in less than 60% of the time required if the set of input processes were performed sequentially. The set of input processes may be performed in less than 50% of the time required if the set of input processes were performed sequentially. The set of input processes may be performed, on average, in less than 50% of the time required if the set of input processes were performed sequentially. The set of input processes may be performed in less than 40% of the time required if the set of input processes were performed sequentially. The set of input processes may be performed, on average, in less than 40% of the time required if the set of input processes were performed sequentially. The set of input processes may be performed in less than 25% of the time required if the set of input processes were performed sequentially. The set of input processes may be performed, on average, in less than 25% of the time required if the set of input processes were performed sequentially.

The set of input processes may be completed with one or more devices consuming less than the total amount of energy required by the one or more devices if the set of input processes were performed sequentially. The set of input processes may be completed with one or more devices consuming at least 5% less than the total amount of energy required by the one or more devices if the set of input processes were performed sequentially. The set of input processes may be completed with one or more devices consuming at least 10% less than the total amount of energy required by the one or more devices if the set of input processes were performed sequentially. The set of input processes may be completed with one or more devices consuming at least 15% less than the total amount of energy required by the one or more devices if the set of input processes were performed sequentially. The set of input processes may be completed with one or more devices consuming at least 20% less than the total amount of energy required by the one or more devices if the set of input processes were performed sequentially. The set of input processes may be completed with one or more devices consuming at least 25% less than the total amount of energy required by the one or more devices if the set of input processes were performed sequentially. The set of input processes may be completed with one or more devices consuming at least 30% less than the total amount of energy required by the one or more devices if the set of input processes were performed sequentially. The set of input processes may be completed with one or more devices consuming at least 40% less than the total amount of energy required by the one or more devices if the set of input processes were performed sequentially. The set of input processes may be completed with one or more devices consuming at least 50% less than the total amount of energy required by the one or more devices if the set of input processes were performed sequentially.

The set of input processes may be completed with a total cost less than that required if the set of input processes were performed sequentially. The set of input processes may be completed with a total cost at least 5% less than that required if the set of input processes were performed sequentially. The set of input processes may be completed with a total cost at least 10% less than that required if the set of input processes were performed sequentially. The set of input processes may be completed with a total cost at least 15% less than that required if the set of input processes were performed sequentially. The set of input processes may be completed with a total cost at least 20% less than that required if the set of input processes were performed sequentially. The set of input processes may be completed with a total cost at least 25% less than that required if the set of input processes were performed sequentially. The set of input processes may be completed with a total cost at least 30% less than that required if the set of input processes were performed sequentially. The set of input processes may be completed with a total cost at least 35% less than that required if the set of input processes were performed sequentially. The set of input processes may be completed with a total cost at least 40% less than that required if the set of input processes were performed sequentially. The set of input processes may be completed with a total cost at least 45% less than that required if the set of input processes were performed sequentially. The set of input processes may be completed with a total cost at least 50% less than that required if the set of input processes were performed sequentially.

In some embodiments, said subtasks are all performed on a sample with a total volume of 250 µL or less. In some embodiments, said subtasks are all performed on a sample with a total volume of 50 µL or less. In some embodiments, said subtasks are all performed on a sample with a total volume of 100 µL or less. In some embodiments, said subtasks are all performed on a sample with a total volume of 150 µL or less. In some embodiments, said subtasks are all performed on a sample with a total volume of 400 µL or less. In some embodiments, said subtasks are all performed on a sample with a total volume of 500 µL or less. In some embodiments, said subtasks are all performed on a sample with a total volume of 750 µL or less. In some embodiments, said subtasks are all performed on a sample with a total volume of 1000 µL or less. In some embodiments, said subtasks are all performed on a sample with a total volume of 1500 µL or less. In some embodiments, said subtasks are all performed on a sample with a total volume of 25 µL to 1500 µL. In some embodiments, said subtasks are all performed on a sample with a total volume of 50 µL to 1000 µL. In some embodiments, said subtasks are all performed on a sample with a total volume of 50 µL to 500 µL. In some embodiments, said subtasks are all performed on a sample with a total volume of 100 µL to 300 µL. In some embodiments, said subtasks are all performed on a sample with a total volume of 50 µL to 300 µL.

In some embodiments, a station is able to perform a subtask that cannot be performed by another station. In some embodiments, a station is able to perform a subtask that can be performed by only one other station. In some embodiments, a station is able to perform a subtask that can be performed by only two other stations. In some embodiments, a station is able to perform a subtask that can be performed by only three other stations. In some embodiments, a station is able to perform a subtask that can be performed by one or more other stations.

The method may comprise providing at least one additional input process after the one or more devices have begun to perform the subtasks generated from the set of input processes, and generating an additional list of one or more subtasks for each of the at least one additional input processes, wherein each subtask is to be performed by a single station of the one or more devices. The method may comprise using a flexible scheduling algorithm to generate an additional ordered schedule of subtasks for the plurality of stations of the one or more devices comprising the additional list of subtasks and the subtasks not yet performed by the one or more devices such that when the subtasks are performed by the one or more devices, the input processes are completed in a manner more efficiently than if the input processes were performed sequentially by the plurality of stations. The method may comprise instructing the stations to perform their associated subtasks according to the additional generated schedule of subtasks.

In certain embodiments, any one or more of the steps of: providing an additional input process, generating an additional list of at least one subtask for the additional input process, using a flexible scheduling algorithm to generate an additional ordered schedule of subtasks, and instructing the stations to perform their associated subtask according to the additional generated schedule may be repeated at least one time. In certain embodiments, any one or more of the steps of: providing an additional input process, generating an additional list of at least one subtask for the additional input process, using a flexible scheduling algorithm to generate an additional ordered schedule of subtasks, and instructing the stations to perform their associated subtask according to the additional generated schedule may be repeated only one time. In certain embodiments, any one or more of the steps of: providing an additional input process, generating an additional list of at least one subtask for the additional input process, using a flexible scheduling algorithm to generate an additional ordered schedule of subtasks, and instructing the stations to perform their associated subtask according to the additional generated schedule is be repeated at least two times. In certain embodiments, any one or more of the steps of: providing an additional input process, generating an additional list of at least one subtask for the additional input process, using a flexible scheduling algorithm to generate an additional ordered schedule of subtasks, and instructing the stations to perform their associated subtask according to the additional generated schedule is be repeated two times.

The device of some embodiments comprises a computing station that performs the scheduling algorithm. The method may comprise providing a computing station separate from the one or more devices that performs the scheduling algorithm and a network that communicated the schedules of subtasks to the one or more devices.

In some embodiments, the biological or chemical assays are selected from the group comprising immunoassays, nucleic acid assays, receptor-based assays, cytometry, colorimetric assays, enzymatic assays, mass spectroscopy, infrared spectroscopy, x-ray photoelectron spectroscopy, electrophoresis, nucleic acid sequencing, agglutination, chromatography, coagulation, electrochemical measurements, microscopy, live cell analysis and histology. In some embodiments, the biological or chemical assays are called input processes or processes, or tests, or orders, or a combination thereof, and are selected from the group comprising immunoassays, nucleic acid assays, receptor-based assays, cytometry, colorimetric assays, enzymatic assays, mass spectroscopy, infrared spectroscopy, x-ray photoelectron spectroscopy, electrophoresis, nucleic acid sequencing, agglutination, chromatography, coagulation, electrochemical measurements, microscopy, live cell analysis, and histology.

Cytometry assays are typically used to optically measure characteristics of individual cells. By using appropriate dyes, stains, or other labeling molecules, cytometry may be used to determine the presence, quantity, and/or modifications of specific proteins, nucleic acids, lipids, carbohydrates, or other molecules. Properties that may be measured by cytometry also include measures of cellular function or activity, including but not limited to phagocytosis, active transport of small molecules, mitosis or meiosis; protein translation, gene transcription, DNA replication, DNA repair, protein secretion, apoptosis, chemotaxis, mobility, adhesion, antioxidizing activity, RNAi, protein or nucleic acid degradation, drug responses, infectiousness, and the activity of specific pathways or enzymes. Cytometry may also be used to determine information about a population of cells, including but not limited to cell counts, percent of total population, and variation in the sample population for any of the characteristics described above. The assays described herein may be used to measure one or more of the above characteristics for each cell, which may be advantageous to determining correlations or other relationships between different characteristics. The assays described herein may also be used to independently measure multiple populations of cells, for example by labeling a mixed cell population with antibodies specific for different cell lines.

In an example, cytometric analysis is by flow cytometry or by microscopy. Flow cytometry typically uses a mobile liquid medium that sequentially carries individual cells to an optical detector. Microscopy typically uses optical means to detect stationary cells, generally by recording at least one magnified image. It should be understood that flow cytometry and microscopy are not entirely exclusive. As an example, flow cytometry assays use microscopy to record images of cells passing by the optical detector. Many of the targets, reagents, assays, and detection methods may be the same for flow cytometry and microscopy. As such, unless otherwise specified, the descriptions provided herein should be taken to apply to these and other forms of cytometric analyses known in the art.

In some embodiments, up to about 10,000 cells of any given type may be measured. In other embodiments, various numbers of cells of any given type are measured, including, but not limited to, more than, less than, or equal to about 10 cells, 30 cells, 50 cells, 100 cells, 150 cells, 200 cells, 300 cells, 500 cells, 700 cells, 1000 cells, 1500 cells, 2000 cells, 3000 cells, 5000 cells, 6000 cells, 7000 cells, 8000 cells, 9000 cells, 10000 cells.

In some embodiments, cytometry is performed in microfluidic channels. For instance, flow cytometry analysis are performed in a single channel or in parallel in multiple channels. In some embodiments, flow cytometry sequentially or simultaneously measures multiple cell characteristics. Cytometry may be combined with cell sorting, where detection of cells that fulfill a specific set of characteristics are diverted from the flow stream and collected for storage, additional analysis, and/or processing. Such sorting may separate multiple populations of cells based on different sets of characteristics, such as 3 or 4-way sorting.

The method may comprise collecting data from at least one of the input processes, utilizing said data to determine a set of one or more processes to be performed in addition to the input processes, generating a list of one or more subtasks for each of the one or more additional processes, wherein each subtask can be performed by a single station of the one or more devices; using said flexible scheduling algorithm to generate an additional ordered schedule of subtasks; and instructing the stations to perform their associated subtasks according to the additional generated schedule of subtasks.

Provided herein is a device that performs a variety of biological or chemical assays comprising: a sample collection station, configured to accept a sample; a plurality of stations, wherein said stations are selected from the group containing sample processing stations, detection stations, and supply stations that provide consumable reagents; a computing unit that is configured to generate an ordered schedule of subtasks for the plurality of stations based on a set of input processes defining the biological or chemical assays to be performed on a sample, wherein each subtask is to be performed by a single station, such that when the subtasks are performed by the device, the set of input processes are completed in a manner more efficiently than if the plurality of processes were performed sequentially, and wherein said computing unit is capable of modifying said schedule of subtasks in real-time; and a control unit that is configured to individually control the plurality of stations to perform their associated subtasks according to the generated schedule of subtasks. In some embodiments efficiency of the processes is based on at least one of: an objective, efficiency goal, goal, ordering principle such as FIFO or LIFO, another value such as time, cost, or energy, and another efficiency measure.

A station may comprise a resource or available resource. Example resources may include a pipette, a reagent, a centrifuge, a lamp, a NAA, a NAA block, or any resource used in any assay contemplated or described herein or in any assay known to one of ordinary skill in the art in testing any biologic, medical, or chemical sample.

Provided herein is a computer-assisted method for scheduling a plurality of processes on one or more devices, comprising: providing a set of input processes defining biological or chemical assays to be performed by the one or more devices, wherein an individual device comprises a plurality of stations, wherein said stations are selected from the group containing sample preparation stations, detection stations, and assay stations that provide consumable reagents; generating a list of one or more subtasks for each of the input processes, wherein each subtask is to be performed by a single station of the one or more devices; for each of the one or more subtasks, determining specified constraints selected from the group consisting of subtask resource requirements, the duration of time required, and subtask ordering requirements; and determining at least one schedule of subtasks and assignment of resources to each subtask in order to complete the entire set of processes consistent with all the specified constraints.

The method may further comprise: from the at least one schedule of subtasks, selecting a preferred schedule to be performed based on the efficiency of performing the set of input processes according to said schedule. The preferred schedule may have the lowest total time required to perform the set of input processes. The preferred schedule may have the lowest total energy required to perform the set of input processes. The preferred schedule may have the lowest total cost required to perform the set of input processes. The preferred schedule may have the lowest time required to perform at least one of the input processes. The preferred schedule may have the lowest total energy required to perform at least one of the input processes. The preferred schedule may have the lowest total cost required to perform at least one of the input processes. The preferred schedule may have the lowest time required to perform the at least two of the input processes. The preferred schedule may have the lowest total energy required to perform the at least two of the input processes. The preferred schedule may have the lowest total cost required to perform at least two of the input processes. The preferred schedule may have the lowest time required to perform the at least three of the input processes. The preferred schedule may have the lowest total energy required to perform the at least three of the input processes. The preferred schedule may have the lowest total cost required to perform at least three of the input processes.

Provided herein is a non-transitory computer readable medium comprising code, language, or instructions for performing a method for determining a subtask order and for assigning resources to each subtask, said method comprising: a) for each of the subtasks, determining the subtask resource requirements and subtask ordering requirements; b) determining a current state of a device, wherein the device comprises a plurality of stations, wherein said stations are selected from the group containing sample preparation stations, detection stations, and assay stations that provide consumable reagents, wherein said state of the device comprises the time to reach the current state from the starting point; the order of completed subtasks, their starting times, and resource allocations; which subtasks are remaining to run, currently running, and complete; and which resources are available, in use, or unavailable due to certain types of previous use; c) generating a list of heuristically reasonable device operations that can be performed next, based on the current state of the device, the subtask resource requirements, and the subtask ordering requirements; d) generating a new state based on said list of device operations; e) repeating (b)-(d) until the method has generated the state or set of states in which all the processes are completed; f) determining the sequence(s) of state(s) based on efficiency of the sequences of states; and g) outputting at least one of said sequences of state(s). The method may further comprise determining whether a state is suboptimal and excluding such a state from consideration.

Generating a heuristically reasonable device operations list may include using search trees of the device operations possible, however, instead of generating all possible solution branches, a heuristically reasonable approach would be to selects branches more likely to produce better efficiency than other branches. This is based, as noted, for example, on the current state of the device, the subtask resource requirements, and the subtask ordering requirements. It may be selective at each decision point, picking branches that are more likely to produce the efficiency sought (i.e. improved timing, cost reduction, energy reduction, and/or other efficiencies).

Provided herein is a non-transitory computer readable medium comprising code, language, or instructions for performing a method for determining a subtask order and for assigning resources to each subtask, said method comprising: a) for each of the subtasks, determining the subtask resource requirements and subtask ordering requirements; b) determining a current state of a device, wherein the device comprises a plurality of stations, wherein said stations are selected from the group containing sample preparation stations, detection stations, and assay stations that provide consumable reagents, wherein said state of the device comprises the time to reach the current state from the starting point; the order of completed subtasks, their starting times, and resource allocations; which subtasks are remaining to run, currently running, and complete; and which resources are available, in use, or unavailable due to certain types of previous use; c) generating a list of device operations that can be performed next, based on the current state of the device, the subtask resource requirements, and the subtask ordering requirements; d) generating a new state based on said list of device operations; e) repeating (b)-(d) until the method has generated the state or set of states in which all the processes are completed; f) determining the sequence(s) of state(s) based on efficiency of the sequences of states; and g) outputting at least one of said sequences of state(s). The method may further comprises determining whether a state is suboptimal and excluding such a state from consideration.

Provided herein is a computer-assisted method for scheduling biological or chemical assays comprising: providing a system comprising one or more stations, an individual station configured to accept a sample and perform at least one subtask for a biological or chemical assay with said sample;

receiving, at said system, at least one sample, upon which at least one station is configured to perform at least one subtask; generating a schedule for said plurality of subtasks formed by said one or more stations based on the efficiency of said schedule and anticipated availability of said one or more stations; receiving, at said system, at least one additional sample, upon which at least one station is configured to perform at least one subtask; and maintaining or modifying said schedule based on the efficiency of said schedule, anticipated availability of said one or more stations, and subtasks to be performed on said at least one additional sample.

The at least one additional sample may be provided after at least one station begins performing a subtask in accordance with said schedule. The at least one additional sample may be provided after at least two stations begin performing a subtask in accordance with said schedule. The at least one additional sample may be provided after at least three stations begin performing a subtask in accordance with said schedule.

The method may comprise collecting information from at least one station; and maintaining or modifying said schedule based on the efficiency of said schedule, anticipated availability of the one or more stations, and said information collected. The increased efficiency may mean that the total time to perform the plurality of subtasks is reduced. The increased efficiency may mean that the total amount of energy consumed by the system during the performance of said plurality of subtasks is reduced. The increased efficiency may mean that the total cost associated with the performance of said plurality of subtasks is reduced. The increased efficiency may mean that the total time to perform any two of the plurality of subtasks is reduced. The increased efficiency may mean that the total amount of energy consumed by the system during the performance of any two of the plurality of subtasks is reduced. The increased efficiency may mean that the total cost associated with the performance of any two of the plurality of subtasks is reduced. The increased efficiency may mean that the total time to perform any three of the plurality of subtasks is reduced. The increased efficiency may mean that the total amount of energy consumed by the system during the performance of any three of the plurality of subtasks is reduced. The increased efficiency may mean that the total cost associated with the performance of any three of the plurality of subtasks is reduced. The increased efficiency may mean that the total time to perform any four of the plurality of subtasks is reduced. The increased efficiency may mean that the total amount of energy consumed by the system during the performance of any four of the plurality of subtasks is reduced. The increased efficiency may mean that the total cost associated with the performance of any four of the plurality of subtasks is reduced.

At least one of said subtasks may be used for immunoassays, nucleic acid assays, receptor-based assays, cytometry, colorimetric assays, enzymatic assays, mass spectroscopy, infrared spectroscopy, x-ray photoelectron spectroscopy, electrophoresis, nucleic acid sequencing, agglutination, chromatography, coagulation, electrochemical measurements, microscopy, live cell analysis and histology. In some embodiments, the biological or chemical assays are called input processes or processes, or tests, or orders, or a combination thereof, and are selected from the group comprising immunoassays, nucleic acid assays, receptor-based assays, cytometry, colorimetric assays, enzymatic assays, mass spectroscopy, infrared spectroscopy, x-ray photoelectron spectroscopy, electrophoresis, nucleic acid sequencing, agglutination, chromatography, coagulation, electrochemical measurements, microscopy, live cell analysis and histology.

The sample may have a volume of 250 uL or less. The sample may have a volume of 50 µL or less. The sample may have a volume of 100 µL or less. The sample may have a volume of 150 µL or less. The sample may have a volume of 400 µL or less. The sample may have a volume of 500 µL or less. The sample may have a volume of 750 µL or less. The sample may have a volume of 1000 µL or less. The sample may have a volume of 1500 µL or less. The sample may have a volume of 25 µL to 1500 µL. The sample may have a volume of 50 µL to 1000 µL. The sample may have a volume of 50 µL to 500 µL. The sample may have a volume of 100 µL to 300 µL. The sample may have a volume of 50 µL to 300 µL.

Provided herein is a system for performing biological or chemical assays, comprising: a sample collection unit, configured to accept a sample; a plurality of stations, an individual station configured to accept at least a portion of said sample and perform at least one subtask for the biological or chemical assay with said portion of said sample; and a controller that generates a schedule for said plurality of subtasks performed by said plurality of stations based on the efficiency of said schedule and anticipated availability of said plurality of stations, and that provides instructions that effects operations of said plurality of stations to perform said subtasks in accordance with said schedule. The controller may be called a PREE herein. The controller may comprise the SOCA, the PREE, the MVP or any combination of these including any combination of aspects of the SOCA, the PREE, and the MVP.

The system may comprise a collection station configured to collect information from at least one station, and wherein the controller maintains or modifies said schedule based on the efficiency of said schedule, anticipated availability of said plurality of stations, and said information collected by said collection station. The station may be selected from the group consisting of: sample preparation station, assay station, detection station, incubation station, and sample handling station. In some embodiments, at least one station comprises a centrifuge. In some embodiments at least one station comprises a thermal block. In some embodiments at least one station is a centrifuge or thermal block. In some embodiments, at least one station comprises a centrifuge or a thermal block.

The schedule may be based on a plurality of said subtasks being performed in a predetermined sequence or relative timing of said subtasks. Increased efficiency may mean that the total time to perform the plurality of subtasks is reduced. Increased efficiency may mean that the total time to perform the plurality of subtasks is reduced as compared to serial performance of the subtasks of the assays and/or serial performance of the assays themselves. Increased efficiency may mean that the total energy to perform the plurality of subtasks is reduced. Increased efficiency may mean that the total time to perform the plurality of subtasks is reduced as compared to serial performance of the subtasks of the assays and/or serial performance of the assays themselves. Increased efficiency may mean that the total cost to perform the plurality of subtasks is reduced. Increased efficiency may mean that the total cost to perform the plurality of subtasks is reduced as compared to serial performance of the subtasks of the assays and/or serial performance of the assays themselves.

In certain embodiments, the sample has a volume of 250 uL or less. The sample may have a volume of 250 uL or less. The sample may have a volume of 50 µL or less. The sample may have a volume of 100 µL or less. The sample may have a volume of 150 µL or less. The sample may have a volume of 400 µL or less. The sample may have a volume of 500 µL or less. The sample may have a volume of 750 µL or less. The sample may have a volume of 1000 µL or less. The sample may have a volume of 1500 µL or less. The sample may have a volume of 25 µL to 1500 µL. The sample may have a volume of 50 µL to 1000 µL. The sample may have a volume of 50 µL to 500 µL. The sample may have a volume of 100 µL to 300 µL. The sample may have a volume of 50 µL to 300 µL.

Machine Vision and Processing (MVP)

The machine vision and processing (MVP) module enables the real-time monitoring of device status and performance. This information, when communicated to SOCA, may be used to further ensure proper device operating conditions before initiation of testing, during testing, and at periodic QC intervals. In addition, this information can enable autocorrection when possible during the operation of the device, identification of device operation abnormalities possibly necessitating repeat testing and/or review by a laboratory director, and possible device service requirements. In addition, MVP provides direct feedback that can be used to control the device robotics and other movements with greater precision and accuracy. Moreover, output from MVP, such as calculated sample and reagent volumes, may be used to make assay calibrations more precise and accurate compared to traditional devices which lack such image analysis capabilities.

MVP can manage numerous test procedures and processes by imaging and processing. Images may be acquired by one or more digital image capture devices within the device. Certain operations by MVP can integrate data from multiple images in order to improve overall performance Image processing may be conducted by MVP both locally on the device and/or remotely on the server side using a variety of algorithms for, such as digital compression, feature selection, noise compensation, edge detection, segmentation, template matching, automatic thresholding, pattern recognition, and classification.

Non-limiting examples of the subtasks performed by MVP based on acquired images include the detection of sample presence, measurement of sample volume, and determination of sample type (e.g. blood, plasma, serum, other). Other example subtasks MVP may perform based on acquired images include measurement of the sample volume delivered to a variety of device detection modules, such as for cell counting, measurement of hematocrit (volume fraction of packed red cells), measurement of the plasma sample volume, evaluation of the quality of the plasma fraction (such as hemolysis (red), effectiveness of the centrifugation process, icteria (yellow), and lipemia (turbid)), measurement of reagent volume(s), measurement of total assay volume, evaluation of sample aspiration and dispense in a variety of tips, well, and cuvettes in the device, including for bubbles, measurement of robotic movements, such as speed and positions, enabling realtime feedback and fine control, measurement and interpretation of assays, such as cytometry assays, colorimetry assays, and nucleic acid assay, optimal measurement of assays (e.g., if the test result is out of range low (OORL) or out of range high (OORH), MVP can request that the device move the test sample to another location in tip having a different pathlength and re-image the assay), detection of any gross problems, such as missing or incorrection sample, reagent, tips, etc., and/or detection and correction of minor problems, such as optical defects in assay tips or small bubbles.

Options, variations, devices, stations, assays, subtasks, or any other subject matter may include that which is disclosed and/or suggested in U.S. patent application Ser. No. 13/244,762 filed Sep. 26, 2011, Ser. No. 13/244,836 filed Sep. 26, 2011, Ser. No. 13/244,946 filed Sep. 26, 2011, Ser. No. 13/244,947 filed Sep. 26, 2011, Ser. No. 13/244,949 filed Sep. 26, 2011, Ser. No. 13/244,950 filed Sep. 26, 2011, Ser. No. 13/244,951 filed Sep. 26, 2011, Ser. No. 13/244,952 filed Sep. 26, 2011, Ser. No. 13/244,953 filed Sep. 26, 2011, Ser. No. 13/244,954 filed Sep. 26, 2011, Ser. No. 13/244,956 filed Sep. 26, 2011, incorporated herein by reference in their entirety for all purposes.

EXAMPLES

The following examples are provided to illustrate selected embodiments. They should not be considered as limiting the scope of the invention, but merely as being illustrative and representative thereof. For each example listed herein, multiple analytical techniques may be provided. Any single technique of the multiple techniques listed may be sufficient to show the parameter and/or characteristic being tested, or any combination of techniques may be used to show such parameter and/or characteristic. Those skilled in the art will be familiar with a wide range of analytical techniques for the characterization of drug/polymer compositions. Techniques presented here, but not limited to, may be used to additionally and/or alternatively characterize specific properties of the compositions with variations and adjustments employed which would be obvious to those skilled in the art.

Example 1

Figure 5:
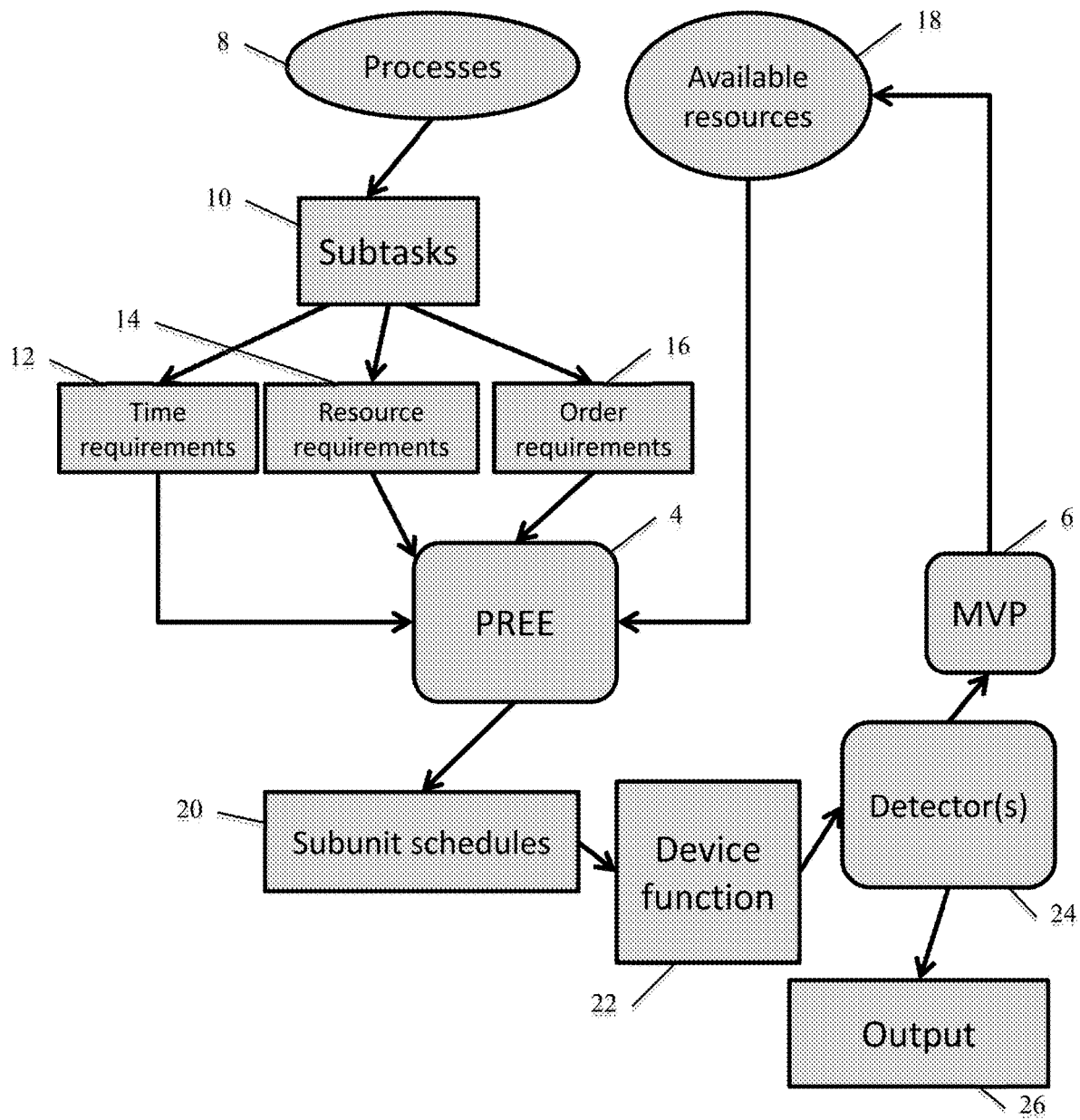
FIG. 5 depicts an example of a PREE embodiment.

FIG. 5 shows an example of a PREE 4. Processes 8 (assays or tests) ordered to be performed by the device are broken down into a list of subtasks 10 which have certain constraints. In this example, the constraints include time requirements 12, resource requirements 14, and/or order (sequence) requirements 16, although others may be also provided such as energy consumption requirements and/or cost requirements, for non-limiting example. These subtasks 10 and/or constraints are provided to the Protocol Execution Engine (PREE) 4 which is also provided information regarding the available resources 18 for the device (such as sample volume, sample identification, reagent volume, stations, or other resources mentioned herein or needed to perform any analytical test on a sample).

The PREE 4 uses a flexible scheduling algorithm to generate an ordered schedule 20 which optimizes the arrangement of subtasks 10 for the stations of the device or devices in order to improve the efficiency of performing the processes 8 ordered. The device or devices or stations thereof are then instructed to perform the subtasks according to the ordered schedule, and the device functions 22 according to the schedule 20.

In this example, a detector 24 (or more than one detector) collects information regarding the status of an individual biological or chemical assay (or stations thereof, or resource availability at such station, for non-limiting example), and provides this information to the MVP 6, which can update the information regarding the available resources 18 to then maintain or modify the schedule 20 of subtasks generated by the PREE 4. The PREE 4, thus, can update the schedule 20 of subtasks according to availability of resources and based on a changing situation or change in the input process or processes, including the addition or removal of a particular resource or input process. Additionally, the detector 24 or another detector can generate an output 26 for any of the assays ordered (e.g. processes 8).

Example 2

Figure 6:
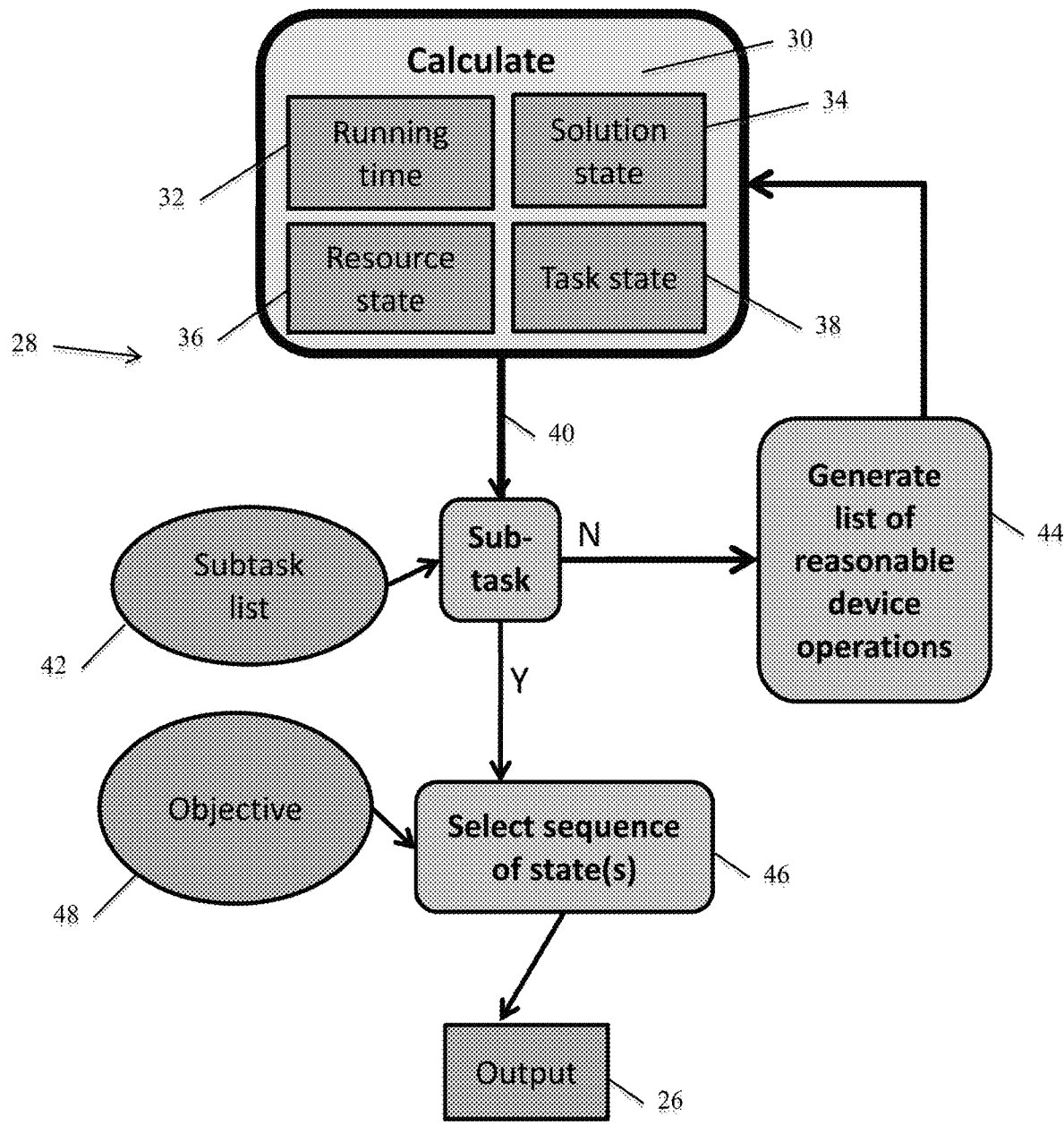
FIG. 6 depicts an embodiment of a flexible algorithm used in the PREE to generate ordered schedule of subtasks.

FIG. 6 depicts an embodiment of a flexible algorithm used in the PREE to generate ordered schedule of subtasks. The algorithm calculates a device state 30 of a device, including for non-limiting example, a running time 32, a solution state 34, a resource state 36, and/or a subtask (or task) state 38. The algorithm uses the calculated device state 30 or the subtask list 42 or both, and determines whether the subtasks are complete 40.

If the subtasks are not complete, a list of reasonable device operations is generated 44, and this information is fed into the calculation of the device state 30, which may be recalculated. If, instead, the subtasks are complete, the algorithm selects a sequence of states 46 using the device states 30 and an objective 48 (or efficiency value) to determine the sequence that is more optimal than if the objective 48 (efficiency value) were not considered.

Example 3

Figure 7:
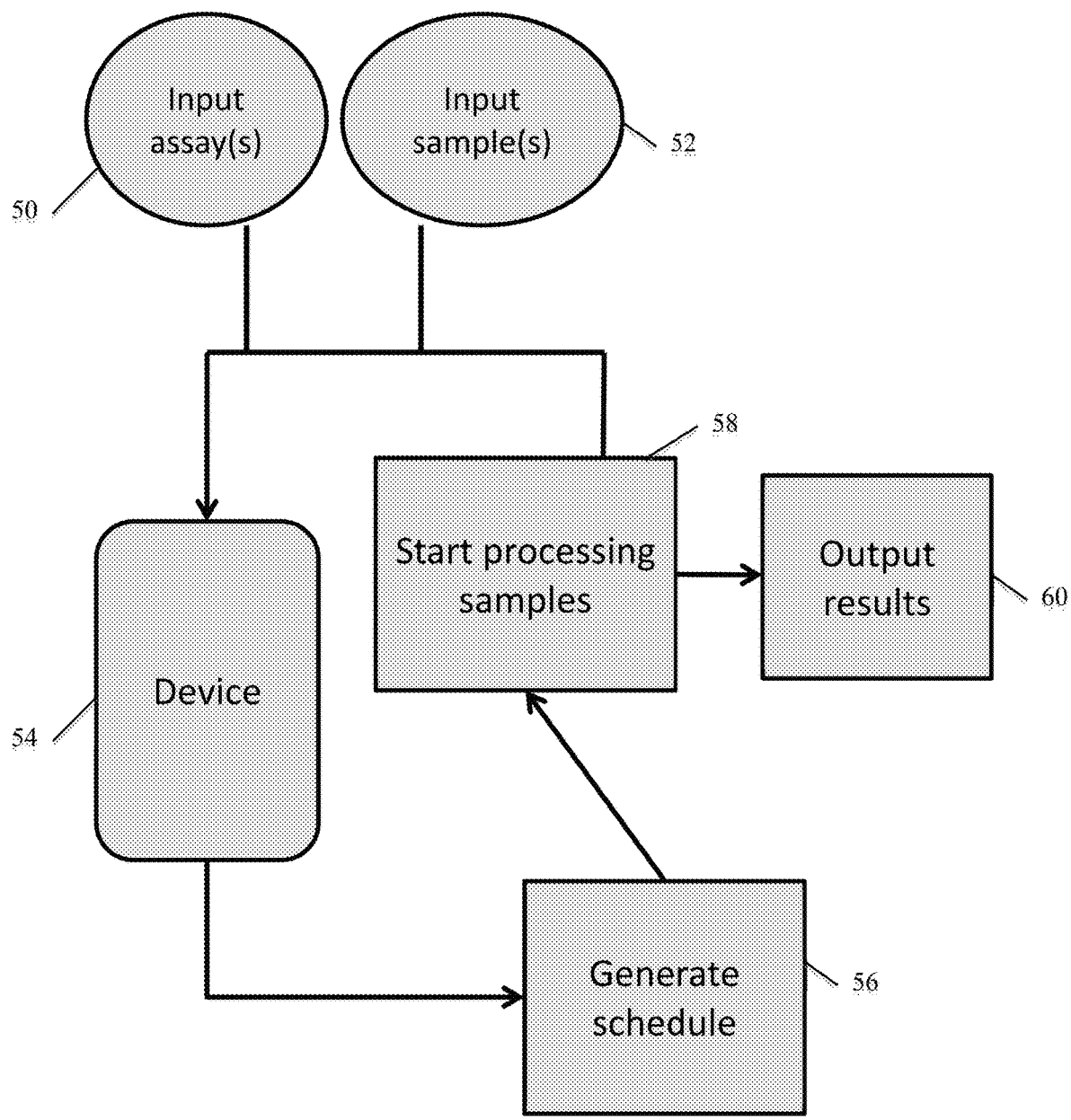
FIG. 7 depicts the adaptability of the algorithm and resulting schedule of subtasks to inputs (processes added, removed, changed, priorities changed, resource changes, constraint changes, at least) even once the first schedule has been started on a device or on devices.

FIG. 7 depicts the adaptability of the algorithm and resulting schedule of subtasks to inputs (processes added, removed, changed, priorities changed, resource changes, constraint changes, at least) even once the first schedule has been started on a device or on devices. In FIG. 7, at least one assay is input in the step: input assay(s) 50, and at least one sample is input in step: input sample(s) 52 into the device 54, which may comprise the PREE which generates a schedule 56 of subtasks, and processing of the samples is started in step: start processing samples 58. Even before all assay(s) are completed and output results 60, or while this is occurring for some assays, additional assays may be inputted, or additional samples may be added, or the generation of the subtask schedule may be changed based on the change in objective (or efficiency value), or some combination of these may occur.

Alternatively, the input of assays may include removal of an assay or of a subtask, or a change to a subtask, including removal thereof for a particular assay or assays. The PREE adjusts to these changing inputs, samples, device capabilities, resources, or constraints by generating an updated schedule of subtasks and processing samples according to this schedule. The PREE may take into account where in the set of subtasks any of the assays ordered are when the updated schedule is generated, or the available resources or device state, alternatively or additionally.

Example 4

Figure 8:
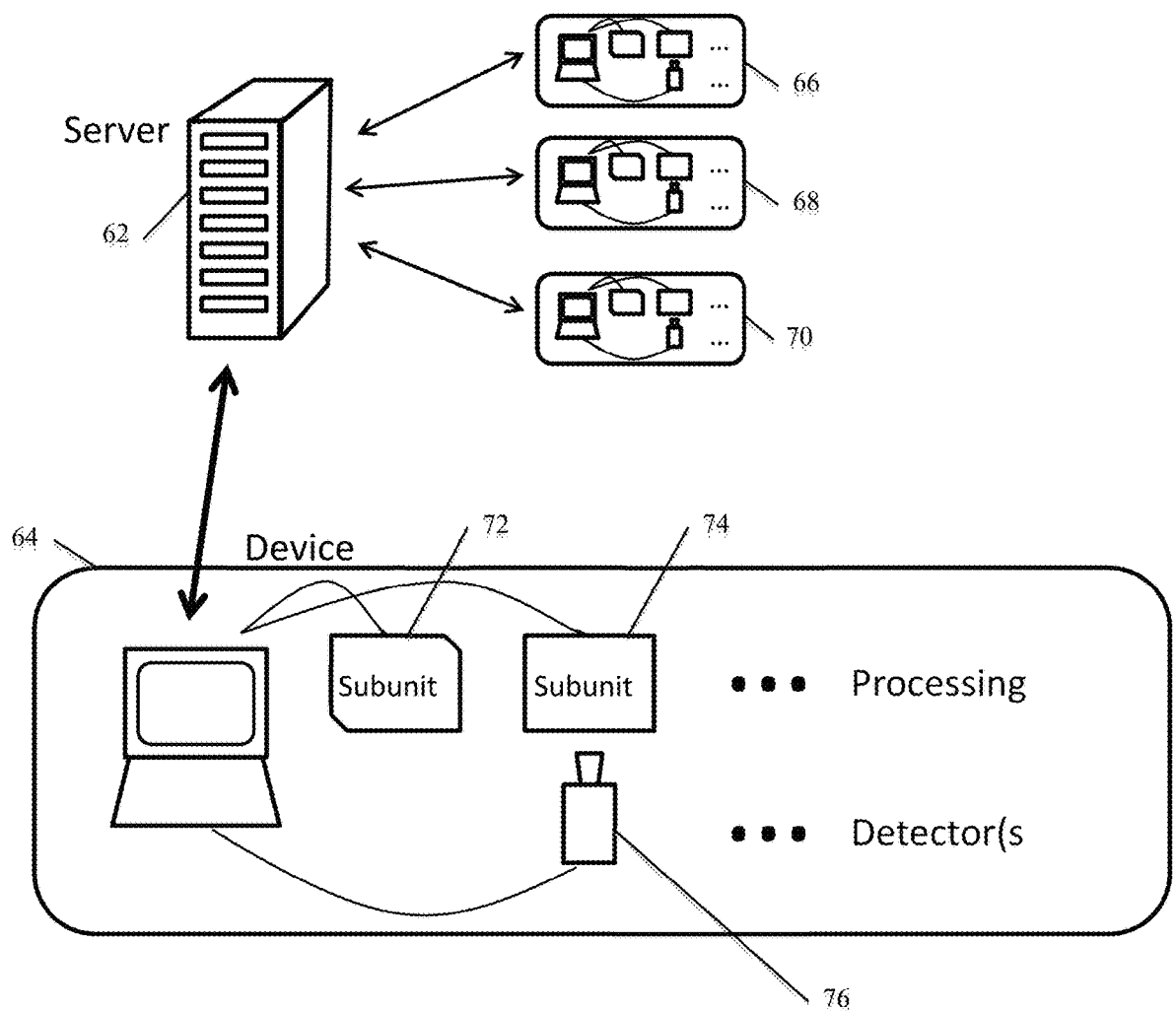
FIG. 8 depicts an embodiment SOCA and multiple devices.

FIG. 8 depicts an embodiment SOCA and multiple devices. The SOCA comprises a server 62 which comprises non-transitory computer readable medium comprising code, language, or instructions that communicates with at least one device 70, or multiple devices 64, 66, 68, 70. The device may also comprise non-transitory computer readable medium comprising code, language, or instructions that can use information received from the SOCA and information from detector(s) 76, processing units 72, 74, or other resources available within or available to the device to generate an optimal schedule of subtasks for the device to perform.

Example 5

Figure 9:
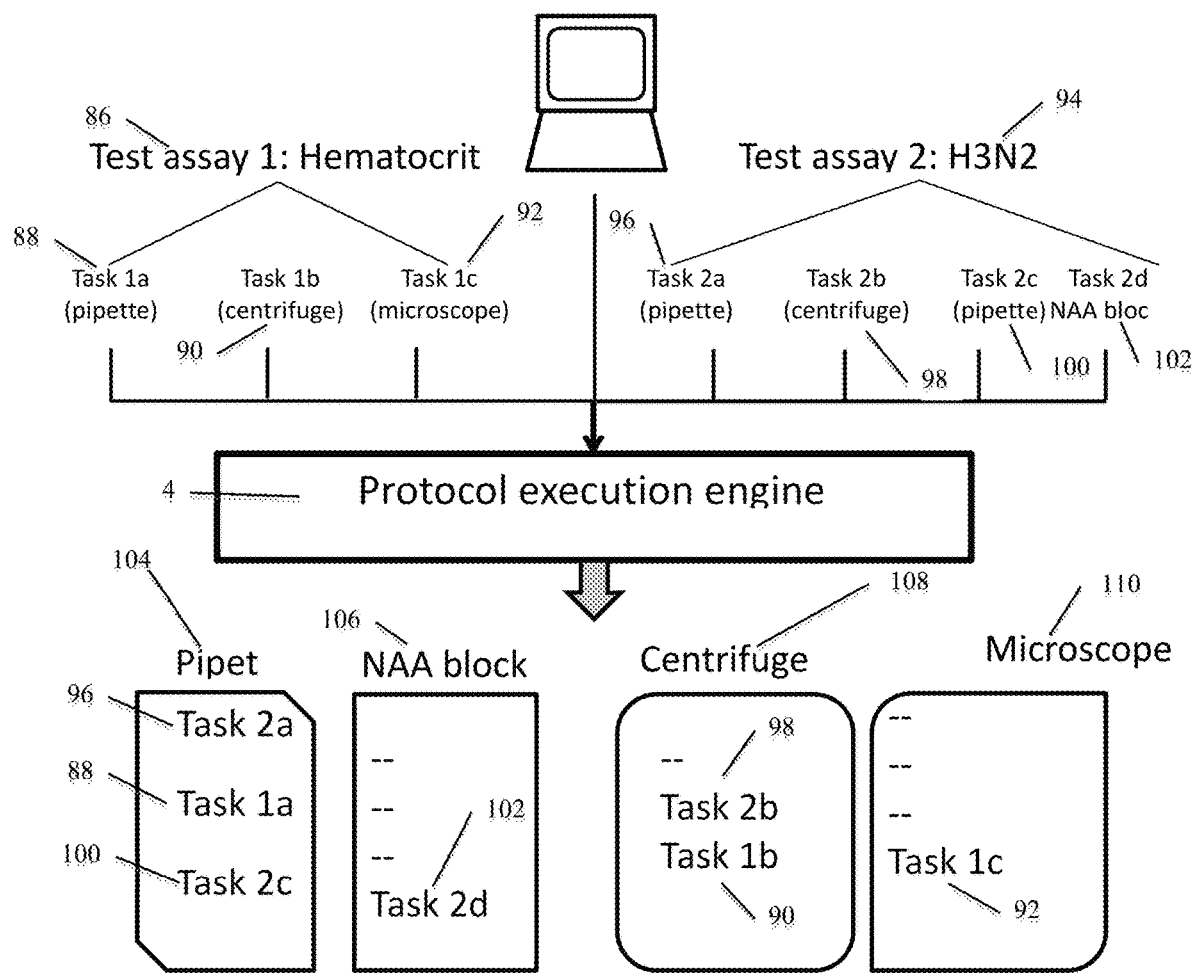
FIG. 9 depicts an embodiment wherein two test assays are scheduled using the flexible algorithm described herein.

FIG. 9 depicts an embodiment wherein two test assays are scheduled using the flexible algorithm described herein. The PREE 4 is provided the information needed to generate an optimal subtask list according to the algorithm as described herein. This comprises, in this example, the subtasks of Test assay 1: Hematocrit 86 such as Task 1a (pipette) 88, Task 1b (centrifuge) 90, and/or Task 1c (microscope) 92, and comprises the subtasks of Test assay 2: H3N2 viral load 94 such as Task 2a (pipette) 96, Task 2b (centrifuge) 98, Task 2c (pipette) 100, and/or Task 2d (NAA block) 102. The PREE may also be provided input from SOCA 2 and the devices, such as available resources, at least one objective (efficiency goal or value), or other device or reagent or sample information. The PREE 4 then generates a schedule of subtasks for each resource, and an order for the subtasks to be performed according to an order which prioritizes the given objective and which more efficiently performs all subtasks of the assays than if the assays were performed serially.

In FIG. 9, the pipette 104 is used for Task 2a 96 then Task 1a 88, then Task 2c 100. The NAA block 106 is used according to the schedule generated by the PREE 4 in FIG. 9 only for Assay 2 94, however, this is done only after task 2c 100 has been performed.

Similarly, the Centrifuge is used in both Test assay 1 86 and Test assay 2 94, however, the PREE 4 scheduled Task 2b 98 to occur prior to Task 1b 90, but that Task 2b 98 may only occur after Task 2a 96, and that Task 1b 90 by the centrifuge 108 occur after Task 1a 88 by the pipette 104. Additionally as shown in FIG. 4, Task 1c is performed by the Microscope 110 (bottom right box in FIG. 9), but only after Task 1b 90 is performed by the centrifuge 108.

The foregoing is illustrative of the present invention, and is not to be construed as limiting thereof. While embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A system for performing biological or chemical assays, comprising:
    a cartridge for receiving a sample from a single patient;
    a sample processing device for receiving the cartridge and for containing a plurality of stations, an individual station configured to accept at least a portion of said sample and perform at least one subtask for the biological or chemical assay with said portion of said sample, wherein the sample processing device performs at least an analyte measurement, a blood analysis, and nucleic acid amplification; and
    a controller that generates a schedule for subtasks performed simultaneously by said plurality of stations based on
    i) a comparison of the efficiency of said schedule as compared to the efficiency of a schedule in which input processes are scheduled sequentially, wherein a second schedule is determined to be more efficient than a first schedule where said second schedule requires less time, or fewer resources, or both, than said first schedule, and
    ii) ii) anticipated availability of said plurality of stations, and that provides instructions that effects operations of said plurality of stations to perform said subtasks in accordance with said schedule;
    wherein reagents are provided to the sample processing device through the cartridge without requiring reagents to be pumped into the device through tubes and/or tanks located outside of the cartridge and wherein the controller is provided with cartridge layout including where each test reagent is located in the cartridge wherein device resources comprises at least one or more pipettes and a centrifuge, wherein each device resource is further characterized by its operating characteristics and capabilities for the controller.

2. The system of claim 1 further comprising a collection station configured to collect information from at least one station, and wherein the controller maintains or modifies said schedule based on the efficiency of said schedule, anticipated availability of said plurality of stations, and said information collected by said collection station.

3. The system of claim 1 wherein said station is selected from the group consisting of: sample preparation station, assay station, detection station, incubation station, and sample handling station.

4. The system of claim 1 wherein at least one station is a centrifuge or a thermal block.

5. The system of claim 1 wherein said schedule is based on a plurality of said subtasks being performed in a predetermined sequence or relative timing of said subtasks.

6. The system of claim 1 wherein said schedule generated by said controller provides reduces the total time required to perform the plurality of subtasks as compared to the total time required by alternative schedules.

7. The system of claim 1 wherein said cartridge receives a sample collection unit configured to accept a sample that has a volume of 250 µL or less.

8. The system of claim 1, further comprising a detection station, wherein said detection station is configured to collect information regarding the status of an individual biological or chemical assay and utilizing said information effective to maintain or modify the schedule of subtasks.

9. The system of claim 1, wherein said controller generates a schedule for said plurality of subtasks performed by said plurality of stations using a flexible scheduling algorithm to generate an ordered schedule of subtasks for the plurality of stations of the one or more devices such that when the subtasks are performed by the one or more devices, the input processes are completed in a manner more efficiently than if the input processes were performed sequentially by the plurality of stations.

10. The system of claim 8, wherein said controller generates a schedule for said plurality of subtasks performed by said plurality of stations using a flexible scheduling algorithm to generate an ordered schedule of subtasks for the plurality of stations of the one or more devices such that when the subtasks are performed by the one or more devices, the input processes are completed in a manner more efficiently than if the input processes were performed sequentially by the plurality of stations.

11. The system of claim 1, comprising a first station and a second station, wherein said first station is configured to perform a subtask that cannot be performed by said second station.

12. The system of claim 8, comprising a first station and a second station, wherein said first station is configured to perform a subtask that cannot be performed by said second station.

13. The system of claim 1, wherein said controller is configured to generate a schedule by using a flexible scheduling algorithm to generate an ordered schedule of subtasks for the plurality of stations of the one or more devices such that when the subtasks are performed by the one or more devices, the input processes are completed in a manner more efficiently than if the input processes were performed sequentially by the plurality of stations.

14. The system of claim 1, wherein, on average, the set of input processes are performed in less than 80% of the time required if the set of input processes were performed sequentially.

15. The system of claim 1, wherein the set of input processes are completed with one or more devices consuming less than the total amount of energy required by the one or more devices if the set of input processes were performed sequentially.

16. The system of claim 1, wherein the set of input processes are completed with a total cost less than that required if the set of input processes were performed sequentially.

17. The system of claim 1, wherein said plurality of stations are selected from the group containing sample processing stations, detection stations, and supply stations that provide consumable reagents; and further comprising a control unit that is configured to individually control the plurality of stations to perform their associated subtasks according to the generated schedule of subtasks.

18. The system of claim 17, wherein said sample collection station is configured to accept a sample with a total volume of 250 µL or less.

19. A system for performing biological or chemical assays, comprising:
a cartridge for receiving a sample from a single patient;
a sample processing device for receiving the cartridge and for containing a plurality of stations, an individual station configured to accept at least a portion of said sample and perform at least one subtask for the biological or chemical assay with said portion of said sample, wherein the sample processing device performs at least an analyte measurement, a blood analysis, and nucleic acid amplification; and
a controller that generates a schedule for subtasks performed simultaneously by said plurality of stations based on
iii) a comparison of the efficiency of said schedule as compared to the efficiency of a schedule in which input processes are scheduled sequentially, wherein a second schedule is determined to be more efficient than a first schedule where said second schedule requires less time, or fewer resources, or both, than said first schedule, and
iv) ii) anticipated availability of said plurality of stations, and that provides instructions that effects operations of said plurality of stations to perform said subtasks in accordance with said schedule;
wherein reagents are provided to the sample processing device through the cartridge without requiring reagents to be pumped into the device through tubes and/or tanks located outside of the cartridge and wherein the controller is provided with cartridge layout including where each test reagent is located in the cartridge, wherein device resources comprises at least one or more pipettes and a centrifuge, wherein each device resource is further characterized by its operating characteristics and capabilities for the controller;
said at least one of said stations comprises a detection station configured to collect information regarding the status of an individual biological or chemical assay and to utilize said information effective to maintain or modify said schedule of subtasks.

20. A system for performing biological or chemical assays, comprising:
a cartridge for receiving a sample from a single patient;
a sample processing device for receiving the cartridge and for containing a plurality of stations, an individual station configured to accept at least a portion of said sample and perform at least one subtask for the biological or chemical assay with said portion of said sample, wherein the sample processing device performs at least an analyte measurement, a blood analysis, and nucleic acid amplification; and
a controller that generates a schedule for subtasks performed simultaneously by said plurality of stations based on
v) a comparison of the efficiency of said schedule as compared to the efficiency of a schedule in which input processes are scheduled sequentially, wherein a second schedule is determined to be more efficient than a first schedule where said second schedule requires less time, or fewer resources, or both, than said first schedule, and
vi) ii) anticipated availability of said plurality of stations, and that provides instructions that effects operations of said plurality of stations to perform said subtasks in accordance with said schedule;
wherein reagents are provided to the sample processing device through the cartridge without requiring reagents to be pumped into the device through tubes and/or tanks located outside of the cartridge and wherein the controller is provided with cartridge layout including where each test reagent is located in the cartridge, wherein device resources comprises at least one or more pipettes and a centrifuge, wherein each device resource is further characterized by its operating characteristics and capabilities for the controller;

wherein the set of input processes are completed in less than the time required if the set of input processes were performed sequentially.

\* \* \* \* \*